(12) United States Patent
Su et al.

(10) Patent No.: US 9,749,986 B2
(45) Date of Patent: Aug. 29, 2017

(54) PAGING MECHANISMS FOR LINK-BUDGET-LIMITED USER DEVICES

(71) Applicant: Apple Inc., Cupertino, CA (US)

(72) Inventors: Li Su, San Jose, CA (US); Stephan V. Schell, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/830,325

(22) Filed: Aug. 19, 2015

(65) Prior Publication Data

US 2016/0066296 A1    Mar. 3, 2016

Related U.S. Application Data

(60) Provisional application No. 62/043,378, filed on Aug. 28, 2014, provisional application No. 62/193,657, filed on Jul. 17, 2015.

(51) Int. Cl.
*H04W 68/00* (2009.01)
*H04W 72/04* (2009.01)
(Continued)

(52) U.S. Cl.
CPC ......... *H04W 68/005* (2013.01); *H04W 68/02* (2013.01); *H04W 72/0446* (2013.01); *H04W 76/048* (2013.01); *H04W 72/048* (2013.01)

(58) Field of Classification Search
CPC ........... H04W 68/005; H04W 72/0446; H04W 72/048; H04W 76/048; H04W 68/02;
(Continued)

(56) References Cited

U.S. PATENT DOCUMENTS 5,835,023 A  * 11/1998 Ito ................ H04W 52/0229
340/7.35
7,197,323 B2 *  3/2007 Terry ................ H04W 68/00
340/7.1

(Continued)

FOREIGN PATENT DOCUMENTS

GB         2509910        7/2014
WO      WO 97/37507      10/1997
(Continued)

OTHER PUBLICATIONS

Partial European Search Report, Application No. 15182131, mailed Jan. 29, 2016, 9 pages.

(Continued)

*Primary Examiner* — Olumide T Ajibade Akonai
(74) *Attorney, Agent, or Firm* — Meyertons Hood Kivlin Kowert & Goetzel, P.C.; Jeffrey C. Hood

(57) ABSTRACT

Various mechanisms for paging link-budget-limited (LBL) devices are disclosed, including: (1) transmitting paging message with non-conventional paging identifier; (2) transmitting paging message(s) with increased power; (3) repeating transmission of paging message to support combining at receiver. Various mechanisms for UE device to signal LBL status are disclosed, including, transmitting status flag or special value of DRX cycle to network node as part of tracking area update and/or attach request. The network node informs a base station of the device's LBL status as part of a paging message. (The network node may, e.g., assign an S-RNTI to the LBL device from a reserved subset of S-RNTI space.) The base station invokes a paging enhancement mechanism when paging an LBL device. Alternatively, the base station may page UE devices without knowledge of LBL status, e.g., by counting paging attempts
(Continued)

for a given UE, and boosting power after the $N^{th}$ paging attempt.

17 Claims, 15 Drawing Sheets

(51) Int. Cl.
    *H04W 76/04*     (2009.01)
    *H04W 68/02*     (2009.01)

(58) Field of Classification Search
CPC .... H04W 68/00; H04W 72/042; Y02B 60/50; H04L 5/0053
USPC ........................................................ 455/458
See application file for complete search history.

(56) References Cited

U.S. PATENT DOCUMENTS

| | | |
|---|---|---|
| 2004/0147271 A1 | 7/2004 | Billon et al. |
| 2012/0113843 A1* | 5/2012 | Watfa ............... H04W 72/1289 370/252 |
| 2013/0083753 A1* | 4/2013 | Lee .................. H04W 72/0453 370/329 |
| 2014/0098761 A1 | 4/2014 | Lee et al. |
| 2014/0198685 A1 | 7/2014 | Xu et al. |
| 2014/0211750 A1* | 7/2014 | Larsson ............... H04L 5/0053 370/330 |
| 2014/0241234 A1* | 8/2014 | Zhu .................... H04W 74/006 370/312 |

FOREIGN PATENT DOCUMENTS

| | | |
|---|---|---|
| WO | 2012043524 | 4/2012 |
| WO | 2013007193 A1 | 1/2013 |
| WO | 2014/131167 A1 | 9/2014 |
| WO | 2015/018353 A1 | 2/2015 |
| WO | 2015/026285 A2 | 2/2015 |
| WO | 2015057134 | 4/2015 |

OTHER PUBLICATIONS

Mediatek Inc., "Impacts of low-cost MTC on RAN2", Discussion and Decision, Mar. 31-Apr. 4, 2014, 4 pages, Valencia, Spain.
Office Action for Japanese Patent Application No. 2015-168077, Jul. 11, 2016, pp. 1-8.
Extended European Search Report for European Patent Application No. 16179623.0, Dec. 1, 2016, pp. 1-8.
NEC, T-Mobile, "Automatic Control of Paging Transmission Power", 3GPP TSG-RAN WG2#58bis, R2-072430, Jun. 25-29, 2007, pp. 1-4.
Communication Pursuant to Article 94(3) EPC, European Patent Application No. 15 182 131.1-1505, dated Apr. 13, 2017, 7 pages.
Cristopher Cox: "An introduction to LTE", Apr. 16, 2012; Wiley; Chicester, UK, ISBN: 1119970385, p. 29.

* cited by examiner sF# = subframe number
PO = paging occasion

PAGING MECHANISMS FOR LINK-BUDGET-LIMITED USER DEVICES

PRIORITY CLAIM INFORMATION

This application claims priority to:

U.S. Provisional Application No. 62/043,378, filed on Aug. 28, 2014, titled "Paging Link Budget Limited User Devices Using a New Paging Identity, by Li Su and Stephan V. Schell; and U.S. Provisional Application No. 62/193,657, filed on Jul. 17, 2015, titled "Paging Link Budget Limited User Devices", by Li Su, Sami M. Almalfouh, Srinivas Burugupalli, Srinivasan Nimmala, Venkateswara Rao Manepalli, and Vijay Kumar Ramamurthi.

All of the above identified Applications are hereby incorporated by reference in their entireties as though fully and completely set forth herein.

FIELD

The present application relates to wireless communication, and more particularly, to paging mechanisms for user equipment devices that are link budget limited.

DESCRIPTION OF THE RELATED ART

Wireless user equipment (UE) devices such as smart phones and tablet computers communicate with wireless networks to perform any of a wide variety of functions such as telephone calls, Internet browsing, email, text messaging, social media updates, navigation using the global positioning system (GPS), gaming, etc.

In cellular radio access technologies (RATs) such as LTE, paging is a procedure used by the network (NW) to inform the user equipment (UE) of an incoming call or data targeted for the UE. A paging message requests the UE to attach to the network, and establish a NAS signaling connection with the network. (NAS is an acronym for Non-Access Stratum. The Non-Access Stratum is a set of protocols in the Evolved Packet System, used to convey non-radio signalling between the UE and the Mobility Management Entity for an LTE/E-UTRAN access.) A paging message can also be used to notify the UE of a system information (SI) change or of ETWS information. (ETWS is an acronym for Earthquake and Tsunami Warning System.)

The network uses the paging procedure mainly because the network does not know the location of the UE, e.g., when the UE is in idle mode. (A Mobility Management Entity may transmit a paging message for a given UE to a plurality of base stations belonging to a tracking area.) Thus, paging may be the first procedure performed by the network to establish a connection with the UE. The use of paging to initiate a connection from the network to the UE is similar to the random access procedure (RACH) used by the UE to initiate a connection with the network. Thus, the detection of a paging message by the UE is extremely important, as the failure of a UE to detect a paging message can lead to missed calls or lost data.

Some wireless devices may be link budget limited (LBL), and thus, experience difficulties in receiving messages transmitted by base stations of the network. The base stations may likewise experience difficulties in receiving messages transmitted by the link-budget-limited devices. A device may be link budget limited for any of various reasons, e.g., if:

the antenna system of the device is performing poorly; or the antenna system of the device is designed to fit within a housing too small for optimum transmission and/or reception performance in the bands of interest;

the device is located far from the base station; or obstructions intervene between the base station and the device (e.g., when the device is located inside a building); or battery power of the device is limited (e.g., limited peak power and/or average TX power).

A link-budget-limited UE may be particularly vulnerable to missing the paging message transmitted by the base station. Thus, there exists a need for mechanisms capable of increasing the likelihood of successful reception of paging messages by link-budget-limited UE devices. Furthermore, there exists a need for mechanisms whereby a UE device may inform the network of whether or not it is link budget limited, so that the network may invoke paging enhancements mechanisms to assist successful completion of paging procedure. It would be highly desirable if such mechanisms could be compatible with (and/or easily extendible from) the existing LTE specifications, e.g., minimum or no impact on LTE network capacity, and/or, minimum or no impact on LTE physical layers, to facilitate ease of implementation.

SUMMARY

In one set of embodiments, a base station of a wireless network may page link-budget-limited UE devices using one or more paging enhancement mechanisms, to enhance the ability of the link-budget-limited UE devices to successfully decode paging messages. (Different embodiments may target the enhancement of different elements of the paging process, e.g., enhancement of paging control information and/or enhancement of paying payload information.) For example, the base station may transmit a paging message a plurality of times so that a link-budget-limited UE device will have the opportunity to combine received data records over the plurality of transmissions, thereby increasing the likelihood of successful decoding of the paging message. As another example, the base station may transmit a paging message with increased power relative to the power that would be used to transmit paging to a non-link-budget-limited UE device. The power increase may be applied to the paging control information and/or to the paging payload of the paging message. As yet another example, the base station may transmit paging messages to link-budget-limited UE devices using a special P-PNTI while non-link-budget-limited UE devices (and conventional UE devices) are paged using a conventional P-RNTI (e.g., an existing P-RNTI defined in the LTE specifications.) P-RNTI is an acronym for Paging-Radio Network Temporary Identifier.

In some embodiments, a UE device may signal whether or not it is link budget limited (LBL) as part of a request to a node in the network. (The request may be a request for a tracking area update and/or attachment to the network.) The network node may then communicate that status-indicating signal to a base station as part of a paging message for the UE device. The base station receives the paging message, and, in response to detecting that the paging message is associated with a link-budget-limited UE device (e.g., based on the status-indicating signal), the base station may page the link-budget-limited UE device using one or more paging enhancement mechanisms.

A UE device may signal its status as an LBL device or a non-LBL device in any of the various ways. For example, the UE device may transmit a flag indicating whether or not it is LBL. The flag may be transmitted to the node as part of a request to the network. As another example, a link-budget-limited UE device may transmit a special value of DRX cycle as part of a request to the network, where the special value is used as a signal of LBL status. (Non-LBL devices may be configured to avoid use of the special value when sending tracking area updates and/or attach requests.) The network node may transmit the special value of DRX cycle to the base station as part of a paging message.

In some embodiments, in response to receiving a signal that a given UE device is link budget limited, a node of the wireless network may assign an S-TMSI value (or other temporary identifier value) to the UE device, where the assigned value is selected from a reserved subset of the space of possible S-TMSI values. (The UE device may provide the signal of LBL status to the node in any of the various ways disclosed herein.) The S-TMSI values of the reserved subset are reserved for assignment to link-budget-limited UE devices. (Non-LBL devices are assigned S-TMSI values from the set complement of the reserved subset.) When the network node transmits a protocol message to page a UE device, the network node may include the assigned S-TMSI of the UE device in the protocol message. The base station knows the definition of the reserved subset. Thus, when the base station receives the protocol message, the base station may determine that the UE device to be paged is link budget limited by virtue of the S-TMSI value belonging to the reserved subset. The base station may then page the UE device using any one or more of the paging enhancement mechanisms disclosed herein.

In some embodiments, the base station may page UE devices without knowledge of whether or not any given UE device is link budget limited. Thus, the base station may employ a paging mechanism that provides enhancement of paging for non-LBL devices as well as LBL devices. For example, in one embodiment, the base station may maintain a count of a number of protocol messages targeted for a given UE device, and, if the count reaches a threshold value N, start boosting the transmission power of any following paging message that is targeted for the UE device.

In one set of embodiments, a method for operating a base station to facilitate paging of user equipment (UE) devices that are link budget limited may be performed as follows.

The base station may transmit a first paging identifier in a control channel of a particular subframe of a particular frame of a downlink data stream, wherein the first paging identifier is dedicated for link budget limited UE devices, and is different from a second paging identifier used for regular UE devices (i.e., UE devices that are not link budget limited), wherein the particular frame and the particular subframe are selected from the downlink data stream based on a paging frame indicator and a paging occasion indicator associated with one or more link-budget limited UE devices to be paged.

The base station may transmit paging payload information for the one or more link-budget limited UE devices in the particular subframe of the particular frame; and The base station may transmit the same paging payload information in each of one or more subframes that follow consecutively after the particular subframe.

The use of a paging identifier different than that used by regular UE devices allows the base station to allocate a larger number of subframes for repeated transmissions of the paging payload information within the particular frame (i.e., the paging frame). For example, in some embodiments, the initial payload transmission at the paging occasion may be followed by up to four consecutive subframes for repeated payload transmissions.

In some embodiments, each of the one or more link-budget-limited UEs may be configured to wake up once per DRX supercycle to scan for the initiation of a new page by the base station. The DRX supercycle may equal $N_{SC}$ times the DRX cycle used by regular UE devices (i.e., UE devices that are not link budget limited and/or conventional UE devices). Each link budget limited UE device computes a page frame (PF) indicator and a page occasion (PO) indicator using its subscriber identity, and wakes up once per DRX supercycle at a particular subframe of a particular frame, where the particular frame and particular subframe are consistent with the PF indicator and PO indicator. Since the link budget limited UE devices have different subscriber identitities (e.g., IMSI values), the paging frames assigned to the link budget limited UE devices may be scattered in time.

The link budget limited UE device scans for the presence of the first paging identifier in the control channel of the particular subframe of the particular frame. Its presence indicates the initiation of a new page.

The base station may transmit additional instances of the paging payload information (i.e., in addition to those instances already included in the particular frame) in each of a plurality of frames that respectively occur $n_{DRX}$, $2n_{DRX}$, $3n_{DRX}$, ..., $N_{SC}-1)n_{DRX}$ frames after the particular frame, where $n_{DRX}$ is number of frames in a DRX cycle. The base station may stop transmitting additional instances if all the link budget limited UE devices targeted by the page message have accessed the network (using random access procedure). The use of the $N_{SC}-1$ frames as described above allow the link budget limited UE devices to combine a substantially larger number of repetitions of the paging payload information, and thus, allows greater improvement in link margin.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1A:
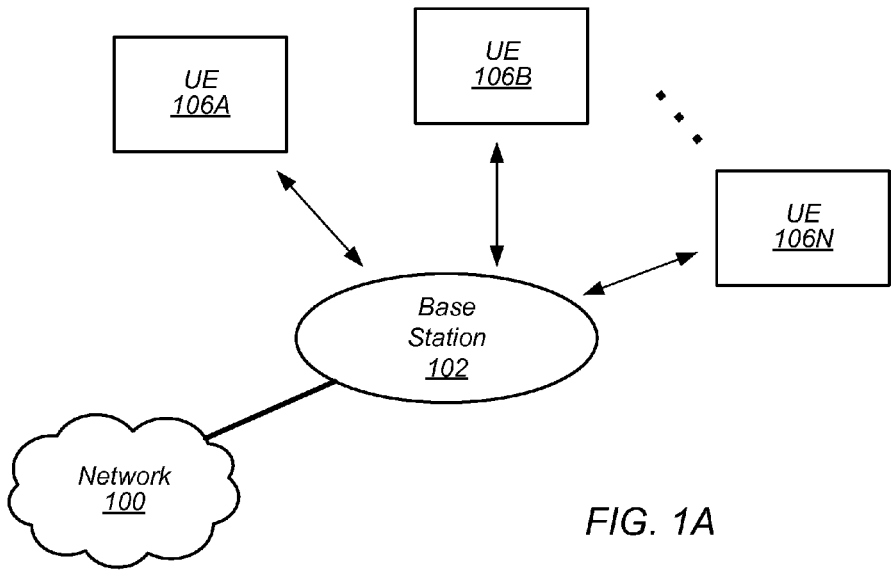
FIG. 1A illustrates an example of a wireless communication system according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below.

BS: Base Station
C-DRX: Connected-State DRX
DL: Downlink
DRX: Discontinuous Reception
IE: Information Element
IMSI: International Mobile Subscriber Identity
LBL: Link Budget Limited
LTE: Long Term Evolution
MIB: Master Information Block
MME: Mobility Management Entity
MS: Mobile Station
NW: Network
OFDM: Orthogonal Frequency-Division Multiplexing
OFDMA: Orthogonal Frequency-Division Multiple Access
PDCCH: Physical Downlink Control Channel
PDSCH: Physical Downlink Shared Channel
PRACH: Physical Random Access Channel
P-RNTI: Paging RNTI
PUCCH: Physical Uplink Control Channel
PUSCH: Physical Uplink Shared Channel
RACH: Random Access Procedure or Random Access Channel.
RAT: Radio Access Technology
RRC: Radio Resource Control
RRC IE: RRC Information Element
RNTI: Radio Network Temporary Identifier
RX: Reception
SAE: System Architecture Evolution, i.e., the System Architecture in LTE
S1AP: S1 Application Protocol
SFN: System Frame Number
SIB: System Information Block
SIBn: System Information Block of Type n
S-TMSI: SAE-Temporary Mobile Subscriber Identity
TAI: Tracking Area Identifier
TTI: Transmit Time Interval
TX: Transmission
UE: User Equipment
UL: Uplink
UMTS: Universal Mobile Telecommunication System
USIM: Universal Subscriber Identity Module
3GPP: Third Generation Partnership Project Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, wearable devices (such as smart watches), etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1A—Wireless Communication System

FIG. 1A illustrates a wireless communication system according to one set of embodiments. It is noted that FIG. 1A represents one possibility among many, and that features of the present disclosure may be implemented in any of various systems, as desired.

As shown, the exemplary wireless communication system includes a base station 102A which communicates over a transmission medium with one or more wireless devices 106A, 106B, etc., through 106N. Wireless devices may be user devices, which may be referred to herein as "user equipment" (UE) or UE devices.

The base station 102 may be a base transceiver station (BTS) or cell site, and may include hardware that enables wireless communication with the UE devices 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and/or between the UE devices 106 and the network 100.

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a wide geographic area via one or more cellular communication technologies.

Thus, while base station 102 may presently represent a "serving cell" for wireless devices 106A-N as illustrated in FIG. 1A, each UE device 106 may also be capable of receiving signals from one or more other cells (e.g., cells provided by other base stations), which may be referred to as "neighboring cells". Such cells may also be capable of facilitating communication between user devices and/or between user devices and the network 100.

Figure 1B:
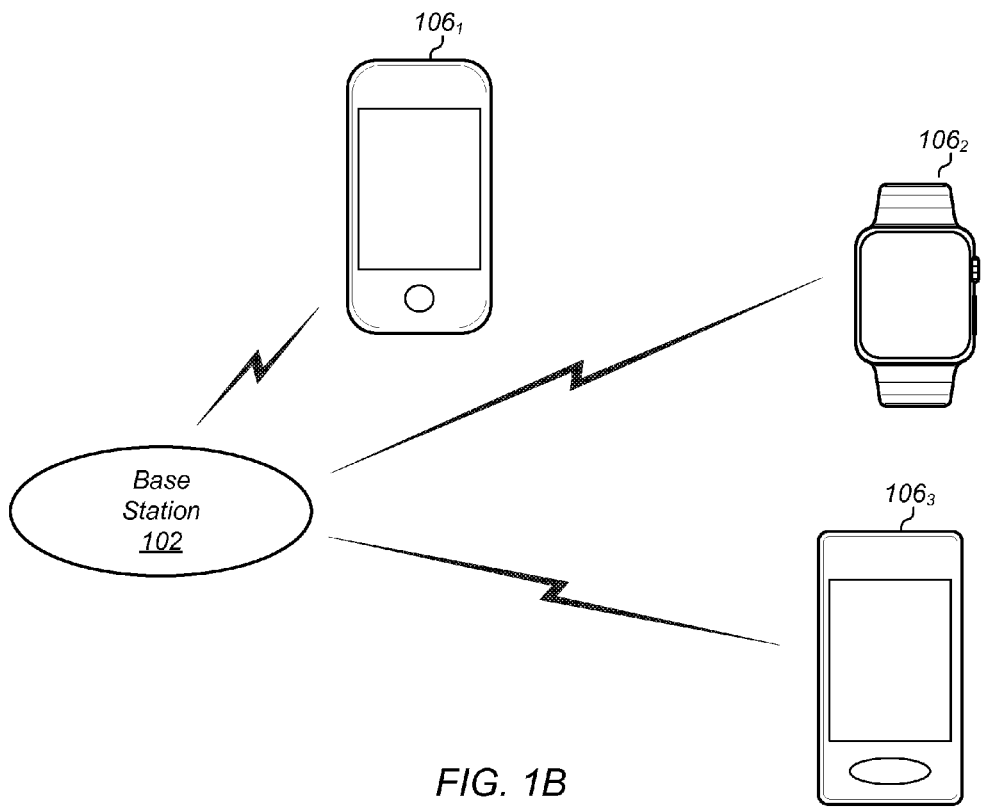
FIG. 1B illustrates an example of the base station 102 in communication with three wireless devices $106_1$, $106_2$ and $106_3$, according to some embodiments.

FIG. 1B illustrates an example of the base station 102 in communication with three wireless devices $106_1$, $106_2$ and $106_3$, according to some embodiments. The wireless devices $106_1$, $106_2$ and $106_3$ may be realized by any combination of the wireless devices described above and/or below.

Note that at least in some instances a UE device 106 may be capable of communicating using multiple wireless communication technologies. For example, a UE device 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication technologies (including more than two wireless communication technologies) are also possible. Likewise, in some instances a UE device 106 may be configured to communicate using only a single wireless communication technology.

Figure 2:
FIG. 2 illustrates a base station ("BS", or in the context of LTE, an "eNodeB" or "eNB") in communication with a wireless device, according to some embodiments.

FIG. 2 illustrates UE device 106 (e.g., one of the devices 106A through 106N) in communication with base station 102, according to some embodiments. The UE device 106 may have cellular communication capability, and as described above, may be a device such as a mobile phone, a hand-held device, a media player, a computer, a laptop or a tablet, a wearable device (such as a smart watch or smart glasses), or virtually any type of wireless device.

The UE device 106 may include a processor that is configured to execute program instructions stored in memory. The UE device 106 may perform any of the method embodiments described herein by executing such stored instructions. Alternatively, or in addition, the UE device 106 may include a programmable hardware element such as an FPGA (field-programmable gate array) that is configured to perform any of the method embodiments described herein, or any portion of any of the method embodiments described herein.

In some embodiments, the UE device 106 may be configured to communicate using any of multiple radio access technologies and/or wireless communication protocols. For example, the UE device 106 may be configured to communicate using one or more of GSM, UMTS, CDMA2000, LTE, LTE-A, WLAN, Wi-Fi, WiMAX or GNSS. Other combinations of wireless communication technologies are also possible.

The UE device 106 may include one or more antennas for communicating using one or more wireless communication protocols or technologies. In one embodiment, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE or 1xRTT (or LTE or GSM), and separate radios for communicating using each of Wi-Fi and Bluetooth. Other configurations are also possible.

Figure 3:
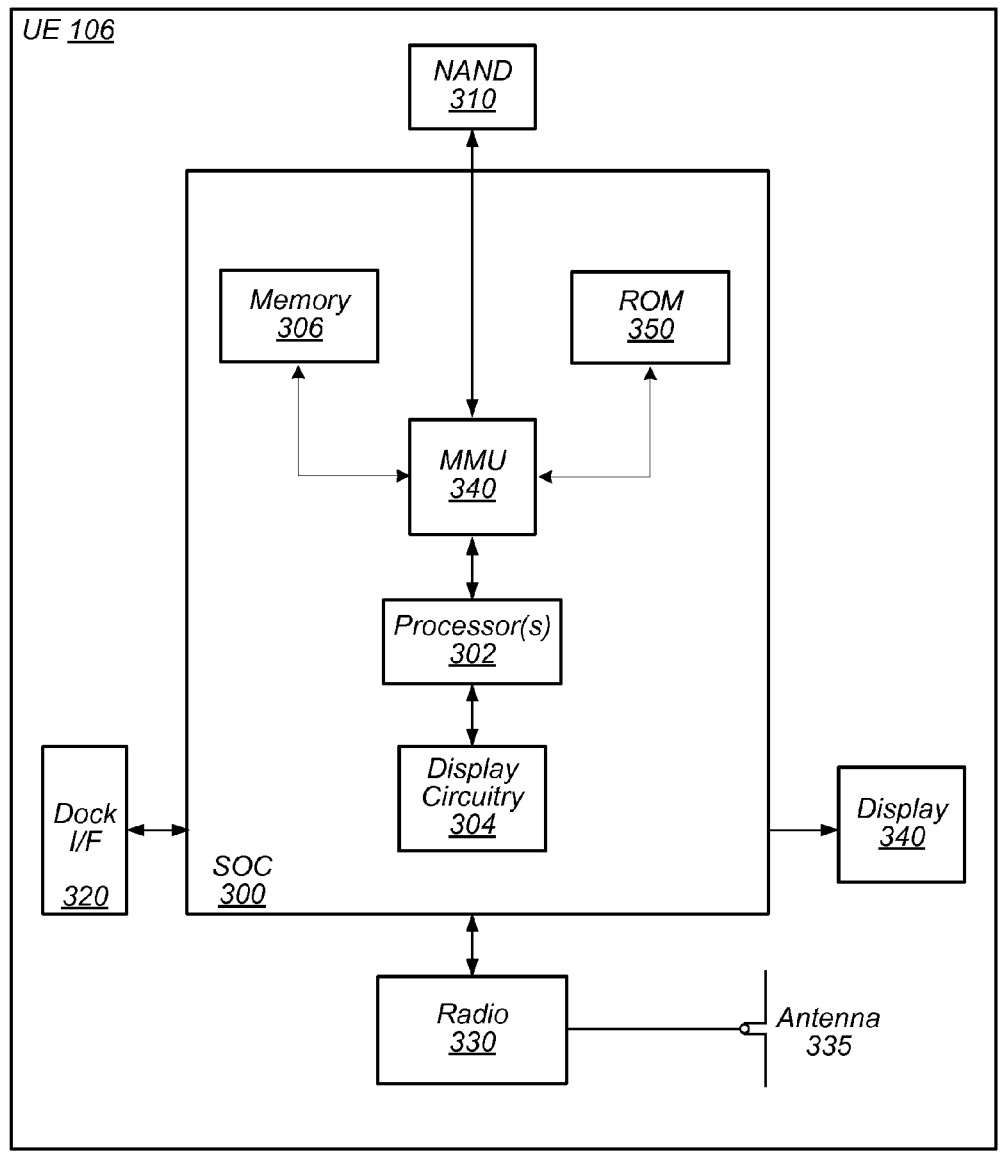
FIG. 3 illustrates a block diagram for a wireless communication system, according to some embodiments.

FIG. 3—Example Block Diagram of a UE

FIG. 3 illustrates a block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106, and display circuitry 304 which may perform graphics processing and provide display signals to the display 340. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310). The MMU 340 may be configured to perform memory protection and page table translation or set up. In some embodiments, the MMU 340 may be included as a portion of the processor(s) 302.

The UE 106 may also include other circuits or devices, such as the display circuitry 304, radio 330, connector I/F 320, and/or display 340.

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to a computer system), the display 340, and wireless communication circuitry (e.g., for communication using LTE, CDMA2000, Bluetooth, WiFi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may in some embodiments be configured to communicate wirelessly using a plurality of wireless communication standards.

As described herein, the UE 106 may include hardware and/or software components for implementing a method for responding to enhanced paging according to embodiments of this disclosure.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
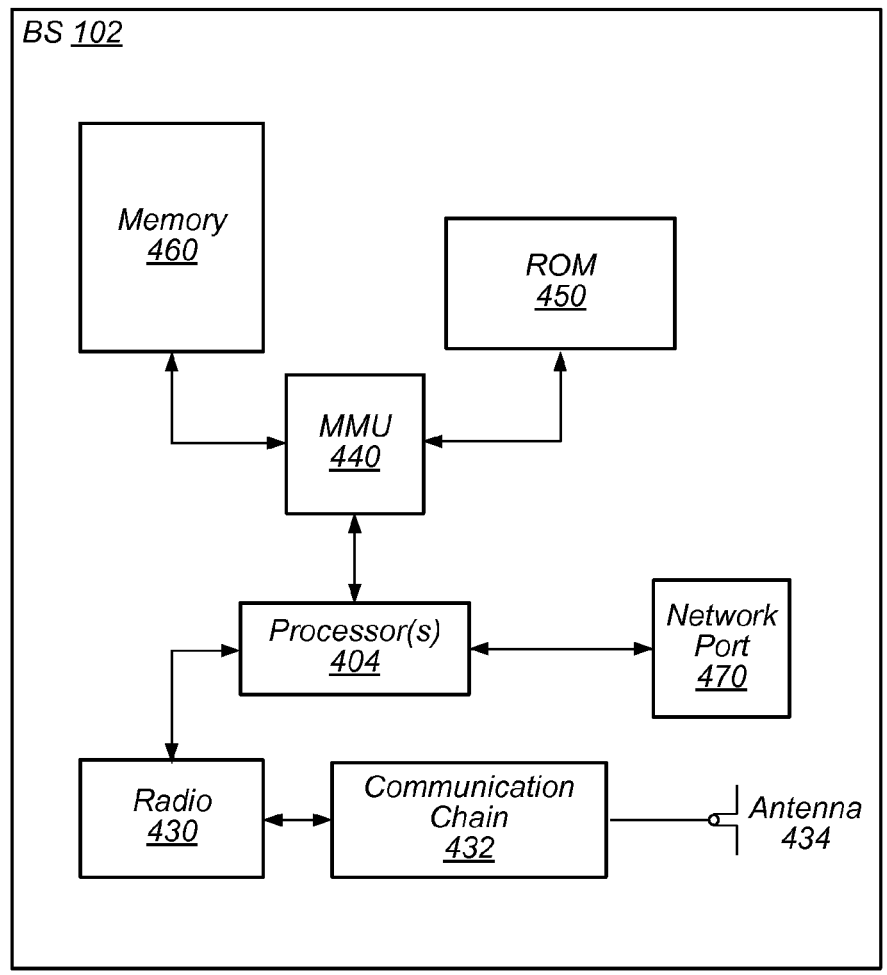
FIG. 4 illustrates a block diagram for a base station, according to some embodiments.

FIG. 4—Base Station

FIG. 4 illustrates a base station 102 according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430, a communication chain 432 and at least one antenna 434. The base station may be configured to operate as a wireless transceiver and may be further configured to communicate with UE devices 106 via radio 430, communication chain 432 and the at least one antenna 434. Communication chain 432 may be a receive chain, a transmit chain or both. The radio 430 may be configured to communicate via various RATs, including, but not limited to, GSM, UMTS, LTE, WCDMA, CDMA2000, WiMAX, etc.

The processor(s) 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Paging in LTE

LTE uses various channels so that data can be transported across the LTE radio interface. These channels are used to segregate the different types of data and allow them to be transported across the radio access network in an orderly fashion. The different channels effectively provide interfaces to the higher layers within the LTE protocol structure, and enable an orderly and defined segregation of the data.

There are three categories or types of LTE data channels as follows.

Physical channels: These are transmission channels that carry user data and control messages.

Transport channels: The physical layer transport channels offer information transfer to Medium Access Control (MAC) and higher layers.

Logical channels: Provide services for the Medium Access Control (MAC) layer within the LTE protocol structure.

LTE defines a number of physical downlink channels to carry information received from the MAC and higher layers. The LTE downlink comprises a Physical Downlink Shared Channel (PDSCH) and a Physical Downlink Control Channel (PDCCH). The PDSCH is the channel that carries all user data and all signaling messages. The PDSCH is the main data bearing channel which is allocated to users on a dynamic and opportunistic basis. The PDCCH carries the layer one control for the shared channel. Thus, the PDSCH is the key channel for communicating information to the UE, and the PDCCH communicates metadata for the information, e.g., "who" the data is for, "what" data is sent, and "how" the data is sent over the air in the PDSCH.

As mentioned above, paging is a procedure performed by the network to inform the UE of incoming data or an incoming call (mobile terminated call). Put more simply, paging is the mechanism used by the network to inform the UE that it has information (e.g., data or a voice call) for the UE. In most instances the UE is in idle mode when the paging process occurs. In the idle mode, the UE performs discontinuous reception (DRX). In other words, the UE is in a sleep mode during part of the DRX cycle, and wakes up during another part of the DRX cycle to check if a paging message is being sent to the UE. Thus, the UE is required to spend energy (from its battery) while in idle mode to periodically monitor the network for paging messages. The UE receives and decodes the content of the paging message, and then the UE initiates the appropriate procedure. For example, the page issued by the network to the UE may cause the UE to attach to the network and establish a NAS signaling connection.

The Physical Downlink Shared Channel (PDSCH) is used to transmit paging payload information to the UE. The payload information may include the International Mobile Subscriber Identity (IMSI) of the UE being targeted by the page and a PS/CS indicator bit that indicates whether the page is for packet switched transfer or circuit switched transfer. (In embodiments where the UE supports only LTE, the PS/CS indicator bit may be omitted from the payload information.) Furthermore, when a plurality of UEs are being paged, the payload information may include a plurality of IMSIs and a plurality of corresponding PS/CS indicators bits.

The Physical Downlink Control Channel (PDCCH) is used to transmit paging control information to the UE. The paging control information may include resource allocation information that specifies the location of the paging payload information in the PDSCH. During idle mode, the UE periodically wakes up and monitors the PDCCH in order to detect the presence of a paging message.

The base station may use a P-RNTI to scramble at least a portion (e.g., the CRC) of the paging control information. (P-RNTI is an acronym for "Paging-Radio Network Temporary Identifier".) The base station transmits the paging control information, including the scrambled portion, in the PDCCH. The P-RNTI is a identifier used for paging, and is not unique to any particular UE.

When the UE detects the presence of the P-RNTI scrambled portion in the PDCCH, it decodes the paging control information, and uses the paging control information to decode the PCH (paging channel) in the PDSCH. (If the UE does not detect the presence of the P-RNTI scrambled portion, the UE may return to its sleep state.) The PCH contains the paging payload information. The paging payload information includes the IMSI of the device targeted by the page. The UE checks the included IMSI to determine if it equals the IMSI of the UE. If the included IMSI is the not the same as the IMSI of the UE, the UE may return to sleep state. (The page was not intended for this UE.) Alternatively, if the included IMSI is equal to the IMSI of the UE, the UE may initiate a random access procedure to connect to the network.

The base station broadcasts system information, and the UE receives the system information. The system information includes parameters that may be used by the UE to determine the frames and subframes in which the UE will wake up and look for the paging messages. These parameters may be found in SIB2 (System Information Block 2).

System Information Blocks (SIBs) provide information from the base station to the UEs about various parameters of both the Access Stratum and Non Access Stratum. The SIBs contain the parameters that are common for all the UEs in the same cell, and are traditionally broadcast in wireless technologies such as LTE.

SIB2 includes a default paging cycle $T_{def}$ (under pcch-Config: defaultPagingCycle) and a parameter nB. Those parameters are used by a UE to determine an identifier for a paging frame and an identifier for a paging occasion. A paging occasion (PO) is a subframe that may possibly include a paging message. A paging frame is a radio frame that may contain one or more paging occasions.

LTE has two timing units, these being the System Frame Number (SFN) and the Subframe Number. SFN is the timing unit in frame scale, and the Subframe Number is the timing unit at the subframe level. Knowledge of both the SFN and the Subframe Number allows location of a particular subframe in the LTE time domain. With respect to discontinuous reception, the paging frame indicator ($I_{PF}$) and the paging occasion indicator $I_{PO}$ allow the UE to know the exact timing when the UE is required to wake up to check for a paging message.

According to 3GPP Specification TS 36.304, a paging frame (PF) is any frame whose system frame number SFN satisfies $$\text{SFN mod } T = (T \text{ div } N) * (\text{UE\_ID mod } N),$$

where T is the DRX cycle of the UE. Any SFN satisfying this equation is said to be a paging frame indicator $I_{PF}$. Thus, the paging frame occurs periodically with a period of T radio frames. T is determined by the minimum of (a) the UE-specific DRX cycle, if a UE-specific DRX cycle is allocated by a higher layer, and (b) the default DRX cycle that is broadcast in SIB2. If a UE-specific DRX cycle has not been configured by a higher layer, the default value is used. According to the LTE specifications, T can be any one of the values 32, 64, 128, 256, and the parameter nB can be any one of the values 4T, 2T, T, T/2, T/4, T/8, T/16, T/32. As noted above, parameter nB is provided in SIB2.

The value N is given by N=min(T,nB), i.e., N is the minimum of T and nB.

UE_ID is determined by the equation: UE_ID=IMSI mod 1024, where IMSI is in decimal format and stored in the USIM of the UE. (USIM is an acronym for Universal Subscriber Identity Module.)

For the paging occasion indicator $I_{PO}$, the 3GPP Specification TS 36.304 defines $I_{PO}$ as shown in the table below, where $$Ns = \max(1, nB/T)$$

$$i\_s = (\text{UE\_ID}/N) \text{ mod } Ns.$$

System Information DRX parameters stored in the UE may be updated locally in the UE whenever the DRX parameter values are changed in system information.

TABLE

| Paging Occasion (PO) for FDD | | | | |
|---|---|---|---|---|
| Ns | $I_{PO}$ for i_s = 0 | $I_{PO}$ for i_s = 1 | $I_{PO}$ for i_s = 2 | $I_{PO}$ for i_s = 3 |
| 1 | 9 | n/a | n/a | n/a |
| 2 | 4 | 9 | n/a | n/a |
| 4 | 0 | 4 | 5 | 9 |

Figure 5A:
FIGS. 5A-5C illustrate paging occasions respectively for $N_S=1$, 2 and 4, according to the prior art.
Figure 5B:
Figure 5C:

See also FIGS. 5A-5C for graphical depictions of each row of the table. FIG. 5A shows that Ns=1 allows only i_s=0, and thus, one paging occasion value $P_{i\_s=0}$=9. FIG. 5B shows that Ns=2 allows only i_s=0 and i_s=1, and corresponding paging occasions values $P_{i\_s=0}$=4 and $P_{i\_s=1}$=9. FIG. 5C shows that Ns=4 allows i_s=0, 1, 2, 3, and corresponding paging occasion values $P_{i\_s=0}$=0, $P_{i\_s=1}$=4, $P_{i\_s=2}$=5 and $P_{i\_s=3}$=9.

In order for the UE to improve its detection of the paging channel (PCH), the UE should be able to reliably detect the presence of P-RNTI in the PDCCH. Currently, PDCCH format 1A/1C is used for the P-RNTI. (See 3GPP Specification TS 36.212 for definition of formats 1A and 1C.)

The number of OFDM symbols carrying the PDCCH depends on the network configuration as well as the aggregation level.

Mechanism for Reliable Decoding of Page Messages in Low Power Environment

Figure 6:
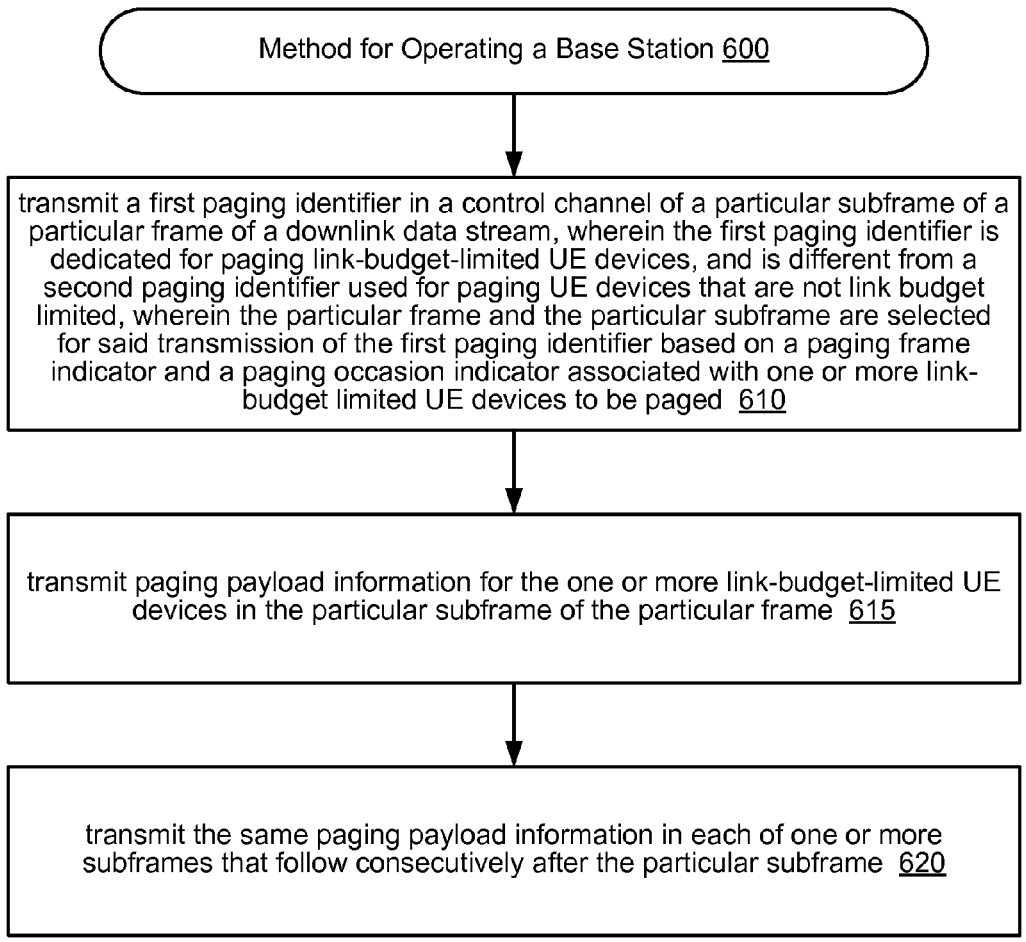
FIG. 6 illustrates a method for operating a base station to facilitate the paging of link budget limited UE devices, according to some embodiments.

In one set of embodiments, a method 600 for operating a base station may be performed as shown in FIG. 6. (The method 600 may also include any subset of the features, elements and embodiments described above in connection with FIGS. 1-5c and described below in connection with FIGS. 7-19.) The method 600 may be performed to facilitate the paging of user equipment (UE) devices that are link budget limited. The method may be performed by a processing agent of the base station. The processing agent may be realized by one or more processors executing program instructions, by one or more programmable hardware elements, by one or more dedicated hardware devices such as ASICs, or by any combination of the foregoing.

While method 600 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 610, the base station may transmit a first paging identifier in a control channel of a particular subframe of a particular frame of a downlink data stream. (In the context of LTE, the control channel may be, e.g., the PDCCH of the particular subframe.) The first paging identifier is dedicated for paging link-budget-limited UE devices, and is different from a second paging identifier used for paging UE devices that are not link budget limited and/or conventional UE devices. (In some embodiments, the second paging identifier may be, e.g., the P-RNTI defined by the existing LTE specifications.) The particular frame and the particular subframe may be selected for said transmission of the first paging identifier based on a paging frame indicator and a paging occasion indicator associated with one or more link-budget limited UE devices to be paged. These one or more link-budget limited UE devices may be a subset of a complete set of link-budget limited UE devices in a geographical region of the base station. The link-budget-limited UE devices of the complete set may be assigned to different paging frames and paging occasions based at least in part on their respective IMSI values. The definition of the complete set may change dynamically as link-budget-limited UE devices enter and/or leave the geographic region of the base station. (Furthermore, in some embodiments, non-link-budget-limited UE devices may change their status to being link budget limited, and/or, link-budget-limited UE devices change their status to being non-link-budget-limited.)

At 615, the base station may initially transmit paging payload information for the one or more link-budget-limited UE devices in the particular subframe of the particular frame. For each of the one or more link-budget limited UE devices to be paged, the paging payload information may include a subscriber identity (e.g., the IMSI) of UE device. The paging payload information may be coded (e.g., channel coded) prior to injection into the particular subframe.

At 620, the base station may transmit the same paging payload information (as in the initial transmission) in each of one or more subframes that follow consecutively after the particular subframe. The initial transmission and the one or more additional transmissions may be used to support soft combining (or alternatively, hard combining) at the one or more link-budget-limited UE devices. The one or more link-budget-limited UE devices are not generally compelled to use all the transmitted instances of the paging payload information. For example, one link-budget limited UE device may be successful in decoding the paging payload information based on the initial transmission (in which case it can ignore the subsequent transmissions of the paging payload information), while another link-budget limited UE device may require the initial transmission and all of the one or more additional transmissions to successfully decode the paging payload information.

Figure 7A:
FIG. 7A illustrates an example of an initial transmission (at paging occasion 0) and four repeated transmissions of paging payload information, according to some embodiments.
Figure 7B:
FIG. 7B illustrates an example of an initial transmission (at paging occasion 5) and four repeated transmissions of paging payload information, according to some embodiments.

In some embodiments, the paging occasion indicator is selected from the set {0,5}, e.g., based on the subscriber identity of a link-budget limited UE device to be paged. (However, a wide variety of other sets are possible.) If the PO indicator equals 0 (denoting subframe 0), the paging payload information may be repeated up to four times using subframes 1, 2, 3, 4, as shown in FIG. 7A. The initial transmission is denoted with the label P, and each repetition is denoted with the label R. If the PO indicator equals 5 (denoting subframe 5), the paging payload information may be repeated up to four times using subframes 6, 7, 8, 9, as shown in FIG. 7B. While FIGS. 7A and 7B show four repetitions after the initial transmission P, in other embodiments fewer repetitions may be used as well.

In the context where there are ten subframes per frame and two allowable paging occasions in the paging frame, the choice of {0,5} as the set of allowable indicator values (for the paging occasion) provides maximal space for repetitions. This principle naturally generalizes to other numbers of subframes per frame and numbers of allowable paging occasions in the paging frame.

In some embodiments, the number of the one or more subframes that follow consecutively after the particular subframe is one or two or three or four.

In some embodiments, where only one paging occasion is allowed in the paging frame, the number of repetitions of the paging payload information may be greater than four. For example, in the case where the paging occasion indicator is allowed to take only the value 0, there may be up $n_{Subframes}-1$ repetition subframes in the paging frame, where $n_{Subframes}$ is the total number of subframes in the paging frame. In the context of LTE, $n_{Subframes}=10$ .

In some embodiments, the base station may also transmit the number (or an indication of the number) of the one or more subframes that follow consecutively after the particular subframe in the particular frame. For example, this number may be broadcast as part of system information (e.g., as part of a system information block).

In response to an indication that at least one of the one or more link-budget-limited UE devices has not yet connected to the base station or the network (using the random access procedure), the base station may, in some embodiments, transmit the same paging payload information (as in the initial transmission of step 615) in each of two or more subframes of an additional frame of the downlink data stream. The additional frame may occur one DRX cycle after the particular frame. For example, if the DRX cycle equals 10 frames, and the initial transmission occurs in frame 0, then the additional frame may be frame 10. In other words, the additional frame may be a paging frame that occurs one DRX cycle after the particular frame.

In some embodiments, the above-mentioned two or more subframes of the additional frame may be subframes consistent with (i.e., having the same subframe numbers as) the initial transmission subframe and the one or more following subframes of the particular frame. For example, if PO=0 and subframes 1, 2, 3, 4 were used to transmit instances of the paging payload information in the particular frame, then subframes 0, 1, 2, 3, 4 may be used in the additional frame to transmit additional instances of the paging payload information.

In response to an indication that at least one of the one or more link-budget-limited UE devices has not yet connected to the base station after step 620, the base station may, in some embodiments, perform up to $N_{SC}-1$ transmission iterations, wherein $N_{SC}$ is greater than or equal to two. Each of the transmission iterations may include: (a) transmitting the paging payload information in each of two or more subframes of an additional frame, where the additional frame occurs a positive integer multiple of DRX cycles after the particular frame, wherein the paging payload information has been included (e.g., encoded) in each of two or more subframes of the additional frame; and (b) in response to a determination that all of the one or more link-budget-limited UE devices have accessed the base station, not performing any further of the transmission iterations.

For example, under the assumption that the DRX cycle is equal to 10 frames, $N_{SC}$ equals four, and the particular frame corresponds to frame number 0, then the base station may transmit repetitions of the paging payload information in each of frames 10, 20 and 30, if needed. It is possible that all of the one or more link-budget-limited UE devices being paged will successfully decode the paging message based on instances of the paging payload information in frames 0 and 10, for example. (The base station or network may sense this early completion condition because each link-budget-limited UE device initiates the random access procedure and connects to the network upon successful decode of the paging payload information.) Thus, the base station may abort any further repetitions in frames 20 and 30, and the resources that would have been used in those frames for further repetitions may be allocated for other uses, e.g., for user data traffic and/or paging of other UE devices.

In some embodiments, in response to an indication that the one or more link-budget-limited UE devices being paged have all connected to the base station (e.g., via random access procedure), the base station may initiate a new page transmission to one or more other UE devices.

It is noted that the above-described use of the particular subframe of the particular frame for paging the one or more link budget limited UE devices does not exclude the possibility of paging non-link-budget-limited UE devices (or conventional UE devices) in the same subframe using the second paging identifier. For example, the base station can transmit a page message to link-budget-limited UE devices in (frame 0, subframe 0) using the first paging identifier, and simultaneously transmit a different page message to the non-link-budget-limited UE devices in (frame 0, subframe 0) using the second paging identifier. However, to accomplish this, the two page messages may use different sets of resources in the PDCCH and different sets of resources in the PDSCH.

It is noted that the above-described use of the particular subframe of the particular frame for paging the one or more link-budget-limited UE devices does not exclude the possibility of paging non-link-budget-limited UE devices (or conventional UE devices) using the second paging identifier in another subframe of the particular frame. For example, the base station can transmit a page message to the link-budget-limited UE devices in (frame 0, subframe 0) using the first paging identifier, and transmit a page message to the non-link-budget-limited UE devices in (frame 0, subframe 4 or 5 or 9) using the second paging identifier.

Figure 8:
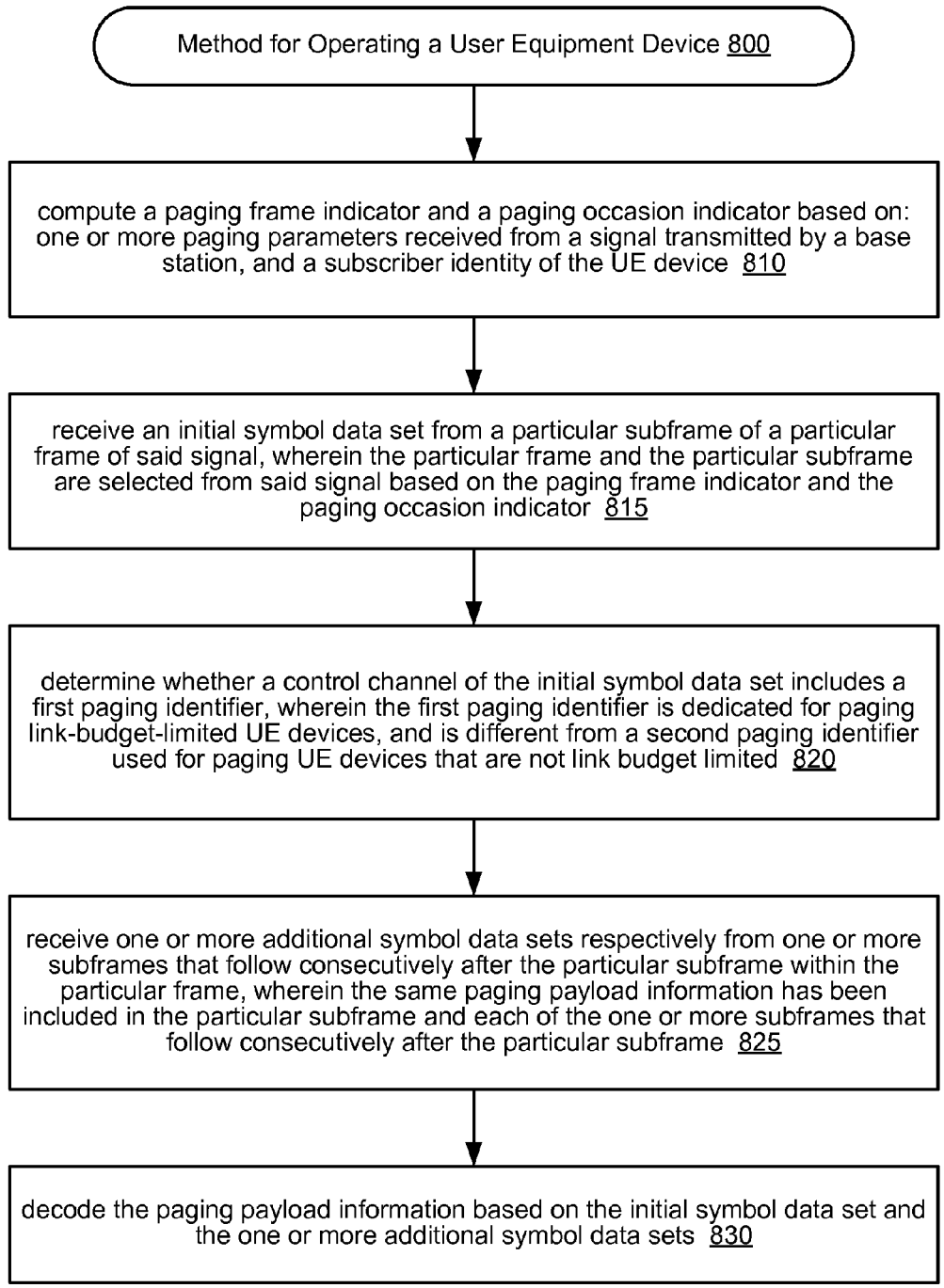
FIG. 8 illustrates a method for operating a link budget limited UE device to receive a paging message from a base station, according to some embodiments.

In one set of embodiments, a method 800 for operating a user equipment (UE) device may be performed as shown in FIG. 8. (The method 800 may also include any subset of the features, elements and embodiments described above in connection with FIGS. 1-7B and described below in connection with FIGS. 9-19.) The method 800 may be performed by a UE device that is link budget limited, in order to facilitate paging of the UE device. The method 800 may be performed by a processing agent of the UE device. The processing agent may be realized by one or more processors executing program instructions, by one or more programmable hardware elements, by one or more dedicated hardware devices such as ASICs, or by any combination of the foregoing.

While method 800 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 810, the UE device may compute a paging frame indicator and a paging occasion indicator based on: one or more paging parameters received from a signal transmitted by a base station; and a subscriber identity (e.g., an IMSI) of the UE device. The one or more paging parameters may include the DRX cycle value T and/or the parameter nB, e.g., as variously discussed above. The subscriber identity may be stored in a memory of the UE device, e.g., in a user identity module (UIM) or subscriber identity module (SIM) of the UE device. The paging frame indicator and paging occasion indicator may determine when the UE device wakes up from sleep in order to perform the following operations.

At 815, the UE device may receive an initial symbol data set from a particular subframe of a particular frame of the signal. The UE device may select the particular frame and the particular subframe from the signal based on the paging frame indicator and the paging occasion indicator. The term "symbol data set" is meant to be interpreted broadly as a plurality of symbols.

At 820, the UE device may determine whether a control channel (e.g., a PDCCH in the context of LTE) of the initial symbol data set includes a first paging identifier, wherein the first paging identifier is dedicated for paging link-budget-limited UE devices, and is different from a second paging identifier used for paging UE devices that are not link budget limited.

At 825, the UE device may receive one or more additional symbol data sets respectively from one or more subframes that follow consecutively after the particular subframe within the particular frame, e.g., as variously described above. The same paging payload information has been included (by the base station) in the particular subframe and each of the one or more subframes that follow consecutively after the particular subframe.

At 830, the UE device may decode the paging payload information based on the initial symbol data set and the one or more additional symbol data sets. For example, the UE device may soft combine the initial symbol data set and the one or more additional symbol data sets to obtain a resultant symbol data set, and decode the paging payload information based on the resultant symbol data set. The combining of the symbol data sets may cause noise to be averaged out, thereby increasing signal-to-noise ratio (SNR).

In some embodiments, the number of the one or more subframes that follow consecutively after the particular subframe is one or two or three or four.

In some embodiments, where only one paging occasion is allowed in the paging frame, the number of the one or more subframes that follow consecutively after the particular subframe may be greater than four. For example, in the case where the paging occasion indicator is allowed to take only the value 0, there may be up $n_{Subframes}-1$ repetition subframes in the paging frame, where $n_{Subframes}$ is the total number of subframes in the paging frame. In the context of LTE frame structure, $n_{Subframes}=10$.

In some embodiments, the number (or an indication of the number) of the one or more subframes that follow consecutively after the particular subframe is received from said signal.

In some embodiments, the paging occasion indicator is a member of the set {0,5} of allowable PO indicator values.

In response to determining that said decoding has failed to correctly recover the paging payload information, the UE device may, in some embodiments, receive two or more further symbol data sets from an additional frame, wherein the additional frame occurs one DRX cycle after the particular frame. The same paging payload information (as transmitted in the particular frame) has been included (by the base station) in each of two or more subframes of the additional frame. Each of the further symbol data sets corresponds to a respective one of the two or more subframes of the additional frame. The UE device may decode the paging payload information based on the initial symbol data set, the one or more additional symbol data sets, and the two or more further symbol data sets. For example, UE device may combine the two or more further symbol data sets with the above-described resultant symbol data set (resulting from combining the initial symbol data set and one or more additional symbol data sets) to obtain an updated resultant symbol data set. The paging payload information may be decoded from the updated resultant symbol data set.

In response to determining that said decoding has failed to correctly recover the paging payload information, the UE device may, in some embodiments, perform up to $N_{SC}$-1 processing iterations, where $N_{SC}$ is greater than or equal to two. Each of the processing iterations may include: (a) receiving two or more further symbol data sets from an additional frame, wherein the additional frame occurs a positive integer multiple of DRX cycles after the particular frame, wherein the same paging payload information has been included in each of two or more subframes of the additional frame, wherein each of the further symbol data sets corresponds to a respective one of the two or more subframes of the additional frame; (b) decoding the paging payload information based on data including the two or more further symbol data sets; (c) accessing the base station (via RACH procedure) and not performing any further of the processing iterations if said decoding successfully recovers the paging payload information.

In some embodiments, information indicating the integer $N_{SC}$ is included in said signal, e.g., in a system information broadcast of the particular frame of the signal.

In some embodiments, in response to determining that said decoding has correctly recovered the paging payload information, the UE device may perform a random access procedure to access the base station (or the network) if the paging payload information indicates the UE device is being paged. Mechanisms for performing random access to wireless base stations are well understood in the art of wireless communication, and need not be elaborated here.

Figure 9:
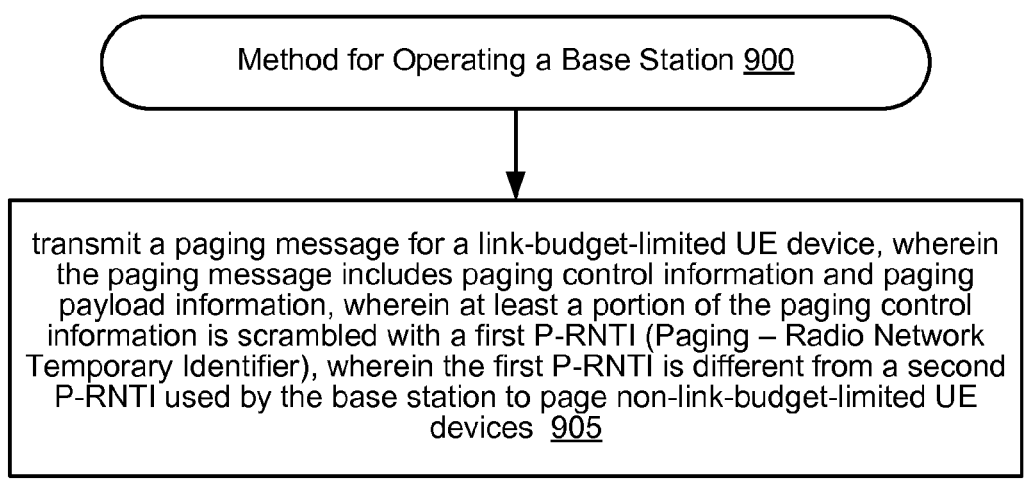
FIG. 9 illustrates a method for operating a base station to facilitate the paging of a link-budget-limited UE device using a non-conventional paging identifier, according to some embodiments.

In one set of embodiments, a method 900 for operating a base station may be performed as shown in FIG. 9. (The method 900 may also include any subset of the features, elements and embodiments described above in connection with FIGS. 1-8 and described below in connection with FIGS. 10-19.) The method 900 may be performed to facilitate the paging of user equipment (UE) devices that are link budget limited. The method may be performed by a processing agent of the base station. The processing agent may be realized by one or more processors executing program instructions, by one or more programmable hardware elements, by one or more dedicated hardware devices such as ASICs, or by any combination of the foregoing.

While method 900 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 905, the base station may transmit a paging message for a link-budget-limited UE device, where the paging message includes paging control information and paging payload information. At least a portion of the paging control information may be scrambled with a first P-RNTI (Paging-Radio Network Temporary Identifier), where the first P-RNTI is different from a second P-RNTI used by the base station to page non-link-budget-limited UE devices. For example, a Cyclic Redundancy Check (CRC) of the paging control information may be scrambled with the first P-RNTI.

In some embodiments, the action of transmitting the paging message may include boosting power of control channel elements (e.g., CCEs of the PDCCH) containing the paging control information, wherein said boosting of power is relative to a power used to transmit paging control to the non-link-budget-limited UE devices.

In some embodiments, the method 900 may also include transmitting a second paging message for a non-link-budget-limited UE device. The second paging message may include second paging control information and second paging payload information, wherein at least a portion of the second paging control information is scrambled with the second P-RNTI (Paging-Radio Network Temporary Identifier).

In some embodiments, the paging message is transmitted in a particular subframe of a particular frame. A subframe number of the particular subframe and a frame number of the particular subframe may be selected for said transmission of the paging message based on: a DRX cycle value; a parameter nB; and a subscriber identity (e.g., IMSI) of the UE device. The subframe number may be selected from a set of allowed paging occasions. The number of paging occasions in the set of allowed paging occasions may be determined by the parameter Ns described variously above. In some embodiments, the set of allowed paging occasions may be different from the conventional set of allowed paging occasions defined in the LTE specifications.

Figure 10:
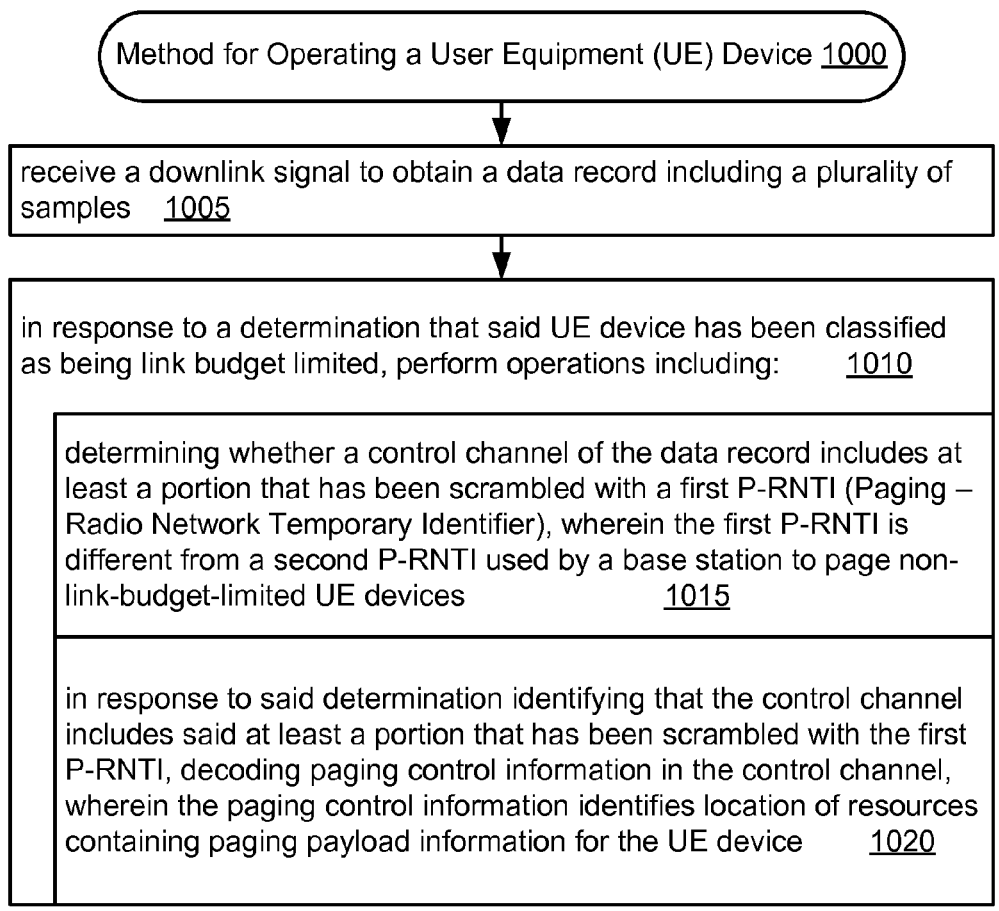
FIG. 10 illustrates a method according to some embodiments, for receiving a paging message involving a non-conventional P-RNTI (Paging-Radio Network Temporary Identifier).

In one set of embodiments, a method 1000 for operating a user equipment (UE) device may be performed as shown in FIG. 10. (The method 1000 may also include any subset of the features, elements and embodiments described above in connection with FIGS. 1-9 and described below in connection with FIGS. 11-19.) The method 1000 may be performed by a UE device that is link budget limited, in order to facilitate paging of the UE device. The method 1000 may be performed by a processing agent of the UE device. The processing agent may be realized by one or more processors executing program instructions, by one or more programmable hardware elements, by one or more dedicated hardware devices such as ASICs, or by any combination of the foregoing.

While method 1000 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1005, the UE device may receive a downlink signal to obtain a data record including a plurality of samples. The downlink signal is transmitted by a base station of a wireless communication network. The downlink signal may be an OFDM signal.

At 1010, in response to a determination that the UE device has been classified as being link budget limited, the UE device may perform a set of operations including operations 1015 and 1020 described below. In some embodiments, the UE device may perform operations 1015 and 1020 without any determination or verification of the link-budget-limited status of the UE device, e.g., if the UE device is link budget limited by design. (Any of the various embodiments described herein may be similarly configured to omit such a determination step, e.g., if the UE device is link budget limited by design, or otherwise permanently categorized as being link budget limited.)

At 1015, the UE device may determine whether a control channel of the data record includes at least a portion that has been scrambled with a first P-RNTI (Paging-Radio Network Temporary Identifier). For example, the scrambled portion may be a CRC of the control channel. The first P-RNTI is different from a second P-RNTI used by the base station to page non-link-budget-limited UE devices. The presence of the first P-RNTI in the control channel indicates that a paging message targeting one or more LBL devices is present in the received data record. The first P-RNTI is not unique to any particular LBL device, but is transmitted by the base station as a general indicator of paging for the LBL device category. Thus, each LBL device may be configured to scan for presence of the first P-RNTI while non-LBL devices (and conventional devices) are configured to scan for presence the second P-RNTI.

In the context of LTE, the data record may correspond to a subframe of the downlink signal, and the data record may include a PDCCH and a PDSCH. The above mentioned control channel may be (or may be included in) the PDCCH.

At 1020, in response to the determination step 1015 identifying that the control channel includes said at least a portion that has been scrambled with the first P-RNTI, the UE device may decode paging control information in the control channel. The paging control information may identify location(s) of resources containing paging payload information for the UE device. Techniques for encoding and decoding information transmitted via channels of wireless signals are well known in the field of wireless communication.

In some embodiments, the base station may be configured to transmit the downlink signal, wherein said transmission of the downlink signal includes boosting power of control channel elements containing the paging control information. The boosting of power may be relative to a power used to transmit paging control to the non-link-budget-limited UE devices.

In some embodiments, the data record is obtained (e.g., captured via A/D conversion) from a particular subframe of a particular frame of the downlink signal, wherein a subframe number of the particular subframe and a frame number of the particular subframe are determined based on paging configuration information and a subscriber identity of the UE device. The paging configuration information may be broadcast by the base station as part of system information. The paging configuration information may include the DRX cycle value and the parameter nB.

In some embodiments, the status of the UE device may change from LBL to not LBL, e.g., by moving closer to a base station, or moving outside a building. Thus, the method 1000 may also include: receiving a second downlink signal to obtain a second data record including a plurality of samples; and, in response to a determination that the UE device has been classified as not being link budget limited, performing additional operations. The additional operations may include:

determining whether a second control channel of the second data record includes at least a portion that has been scrambled with the second P-RNTI; and in response to said determination identifying that the second control channel includes said at least a portion that has been scrambled with the second P-RNTI, decoding second paging control information in the second control channel, wherein the second paging control information identifies location of second resources containing second paging payload information for the UE device.

In one set of embodiments, a method for operating a base station to facilitate paging of user equipment (UE) devices that are link budget limited may be performed as follows. (The method may also include any subset of the features, elements and embodiments described above in connection with FIGS. 1-10 and described below in connection with FIGS. 11-19.)

The base station may transmit a paging identifier in a control channel of a particular subframe of a particular frame of a downlink data stream. (For example, the control channel may be the PDCCH of LTE, and the paging identifier may be a P-RNTI conforming to the existing LTE specifications.) The particular frame and the particular subframe may be selected for transmission of the paging identifier based on a paging frame indicator and a paging occasion indicator associated with one or more link-budget limited UE devices to be paged. The paging frame indicator and the paging occasion indicator may be determined based on a DRX cycle value, the parameter Nb, and the IMSI of a UE device to be paged.

The base station may initially transmit paging payload information for the one or more link-budget limited UE devices in the particular subframe of the particular frame. The paging payload information may be transmitted in a PDSCH of the particular subframe.

The base station may transmit the same paging payload information (as in the initial transmission) in each of one or more subframes that follow consecutively after the particular subframe.

By transmitting the paging payload information a plurality of times (i.e., the initial transmission plus the one or more following transmissions), the base station enables the one or more link-budget-limited UE devices to combine respective copies of the paging payload information. The quality of the combined data record may improve as the number of incorporated copies increases. Thus, the likelihood of successful decode of the paging payload information may likewise increase.

In some embodiments, the paging occasion (PO) indicator may be restricted so that it can only take values in the set complement of the set of PO indicator values allowed in an existing wireless communication standard. (For example, the mapping of index i_s to PO indicator values may be modified to implement such a restriction.) The set of PO indicator values allowed in 3GPP TS 36.304 is $\{0, 4, 5, 9\}$. Thus, in some embodiments, the PO indicator, when used to page UE devices that are link budget limited, may be restricted to the allowed set $\{1,2,3,6,7,8\}$ or a subset thereof. For example, the PO indicator may be restricted to the set $\{1,6\}$. (For example, the mapping of index i_s to PO indicator values in the case $N_S=2$ may be modified to implement such a restriction.) Furthermore, the one or more subframes that follow consecutively after the particular subframe may be subframes whose subframe numbers also reside in the allowed set {1,2,3,6,7,8} or a subset thereof. For example, when the PO indicator equals 1, the one or more following subframes may be subframes 2 and 3. As another example, when the PO indicator equals 6, the one or more following subframes may be subframes 7 and 8.

In some embodiments, when paging a link-budget-limited UE device, the base station may employ a DRX cycle value $T_{LBL}$ that is $N_{SC}$ times larger than the DRX cycle T used by regular UE devices (i.e., conventional UE devices and/or UE devices that are not link budget limited):

$$T_{LBL}=N_{SC}*T_{REG},$$

where $N_{SC}$ is an integer greater than or equal to two. The integer $N_{SC}$ or an encoded representation thereof may be included in system information transmitted by the base station. The link-budget-limited UE device may be configured to employ the same DRX cycle value $T_{LBL}$. Thus, a link-budget-limited UE device wakes up in a paging frame once every $T_{LBL}$ frames to check for the transmission of a new paging message. (As variously described above, the UE device may remain awake to receive one or more additional transmissions of paging message in successive subframes of the paging frame if the initial instance of the paging message is not successfully decoded.) This feature of using the DRX cycle value $T_{LBL}$ instead of the regular DRX cycle value T is referred to herein as "DRX supercycling with factor $N_{SC}$".

In some embodiments, when paging a link-budget-limited UE device, the base station may perform: DRX supercycling with factor $N_{SC}$; and transmission of payload repetitions in each of up to $N_{SC}$-1 frames occurring at integer multiples of the conventional DRX cycle T after the initial transmission frame (i.e., the above-described particular frame), e.g., as described variously above. The subframes used to transmit instances of the paging payload in each of the $N_{SC}$-1 frames may be the same as or different from the subframes used in the initial transmission frame.

In one set of embodiments, a method for operating a user equipment (UE) device that is link budget limited may be performed as follows.

The UE device may compute a paging frame indicator and a paging occasion indicator based on: one or more paging parameters received from a signal transmitted by a base station; and a subscriber identity (e.g., IMSI) of the UE device.

The UE device may determine whether a control channel of a particular subframe of a particular frame of the signal includes a paging identifier. (For example, the control channel may be the PDCCH of LTE, and the paging identifier may be an existing P-RNTI of LTE.)

The UE device may receive an initial symbol data set from the particular subframe of the particular frame. The initial symbol data set includes a plurality of samples.

The UE device may receive one or more additional symbol data sets respectively from one or more subframes that follow consecutively after the particular subframe within the particular frame, wherein the same paging payload information has been encoded in the particular subframe and each of the one or more subframes that follow consecutively after the particular subframe.

The UE device may decode the paging payload information based on the initial symbol data set and the one or more additional symbol data sets. By combining the initial symbol data set and the one or more additional symbols data sets, the UE device may increase the likelihood of successful decoding of the paging payload information. The combining may have the effect averaging out noise.

In some embodiments, the UE device may further perform the DRX supercycling with factor $N_{SC}$ and the decoding of payload repetitions at up to $N_{SC}$-1 frames (occurring at integer multiples of the regular DRX cycle after the initial transmission frame), e.g., as described variously above. The subframes used to decode instances of the paging payload in the $N_{SC}$-1 frames may be the same as or different from the subframes used in the initial transmission frame.

Additional Paging Embodiments

In some embodiments, the UE device may use a UE Radio Capability Report message to inform the network (NW) that it is a link-budget-limited UE device. (The UE Radio Capability Report of 3GPP TS 36.331 may be extended to support this function of signaling LBL status.) Thus, the network (e.g., the MME) can associate the IMSI of this UE device with the link-budget-limited category.

In some embodiments, when the base station (e.g., the eNodeB in the context of LTE) receives a page command from the Mobility Management Entity (MME) to send a page message, the base station transmits the page message in a paging occasion of a paging frame, wherein the paging occasion (PO) and the paging frame (PF) are selected based on: the IMSIs of the UEs to be paged; and one or more DRX parameters transmitted in system information. The paging frame may contain one or more available POs (e.g., subframes 0, 4, 5, 9 in LTE).

If one of the UEs to be paged belongs to the LBL category, the base station may initially send the page message using P-RNTI and on one of the PO values from the allowable set {0, 4, 5, 9}, and send the same page message in each of N successive subframes after the PO and before the next PO of the allowable set. ("After the PO" does not necessarily mean "immediately after" the PO, as illustrated by examples (b) and (d) in the paragraph below.) For example, if the paging message is initially transmitted on PO=0, the same paging message can be repeated up to three times on subframes 1, 2, 3. As another example, if the paging message is initially transmitted on PO=5, the same paging message can be repeated up to three times on subframes 6, 7, 8. As yet another example, if the paging message is initially transmitted on PO=4, the same paging message can be repeated on subframes 6, 7, 8, provided those subframes are not being used to transmit repetitions of an independent paging message associated with PO=5. As yet another example, if the paging message is initially transmitted on PO=9, the same paging message can be repeated on subframes 1, 2, 3 of the next frame, provided those subframes are not being used to transmit repetitions of an independent paging message associated with PO=0 of the next frame.

The following are additional examples of how the base station may perform paging repetition.

(a) Transmit a page message on PO=0, and repeat on subframe 1.
(b) Transmit a page message on PO=4, and repeat on subframe 2 of the next frame.
(c) Transmit a page message on PO=5, and repeat on subframe 6.
(d) Transmit a page message on PO=9, and repeat on subframe 7 of the next frame.

The UE may be configured with knowledge of the repetition scheme used by the base station. The repetition scheme may, e.g., define the number of the one or more repetitions and the subframe location(s) of the one or more repetitions for each possible value of PO).

In some embodiments, the base station may group the LBL UEs from the set of UEs to be paged into a separate page message that is transmitted using a different P_RNTI (which may be referred to as "P_RNTI_LBL"). In one or more of these embodiments, the separate page message may be sent on subframe PO=0 or 5, and each of N contiguous subframes after the PO. For example, if PO=0, then send the page message on subframe 0, and repeat on each of subframes 1, 2, 3 and 4; if PO=5, then send the page message on subframe 5, and repeat on each of subframes 6, 7, 8, 9.

As the page message becomes larger and larger when more and more IMSIs are included in the message, even the above-described five transmissions (one initial transmission plus four additional transmissions) may not be enough for the new P_RNTI_LBL case. Thus, in some embodiments, the same page message may be repeated in the next DRX cycle. This form of repetition may be implemented as follows.

In some embodiments, to avoid the undesirable condition that the UE is awake too long in every DRX cycle, a hybrid scheme may be used, namely, repeat the paging message in one or more consecutive subframes of the paging frame, and if more repetition is needed, then repeat this process across one or more additional DRX cycles. The repeated transmissions for a given PO may be arranged so that none of them collides with next potential PO.

In some embodiments, the DRX cycle for LBL devices may be defined as $N_{SC}$*(normal DRX cycle), where $N_{SC}$ is an integer greater than or equal to two. For example, if the current normal DRX cycle is 256 ms, new page messages may, in some embodiments, be transmitted once every $N_{SC}$*256 ms. The POs on the ($N_{SC}$-1) radio frames occurring at 1, 2, 3, . . . , $N_{SC}$-1 normal DRX cycles after the initial transmission frame may be used for repeated transmissions of the page message. Thus, an LBL UE may still wake up every normal DRX cycle, but only scans for a new page message once every ($N_{SC}$*DRX_cycle) frames.

In some embodiments, the number of subframes used to repeatedly transmit the paging payload in the PF, and the number $N_{SC}$ may be broadcast in system information.

In some embodiments, the base station may be configured to avoid grouping LBL UEs and non-LBL UEs together in the same page message, to be more radio resource efficient.

In some embodiments, an LBL UE may read system information to obtain the page repetition number, and may continue to combine and decode the next repetition subframe if the current combination including the current subframe does not result in successful decode.

In some embodiments, for the non-LBL UE, its page decoding process may remain same as in the prior art.

Some of the embodiments described herein may improve downlink link margin for LBL devices.

Some of the embodiments described herein may be compatible with the existing LTE network, with no negative impact on paging for non-LBL UE devices.

Signaling Link-Budget-Limited Status via S-TMSI Value

In LTE networks, the paging of a UE device in idle mode may be initiated by the Mobility Management Entity (MME) by the transmission of an S1AP message from the MME to one or more base stations. The S1AP message may include:
- page related information (i.e., UE_ID and IDRX cycle length); and
- page identity information (S-TMSI or IMSI) of the UE to be paged.

In most situations, the page identity information is S-TMSI (SAE-Temporary Mobile Subscriber Identity). However, in an urgent case such as an emergency, the IMSI may be used as the paging identity information. S-TMSI is a temporary ID assigned by the MME when a UE attaches to the MME or initiates a tracking area update to the MME.

In one set of embodiments, as part of an attach message or a tracking-area-update message, the UE can signal its status as a link-budget-limited device to the MME. (The UE may employ any of the various methods disclosed herein to inform the MME of its LBL status.) The MME may then assign to this UE an S-TMSI selected from a subset of the space of possible S-TMSI values, where the subset is reserved for the class of link-budget-limited UEs. The reserved subset (e.g., one or more ranges of S-TMSI values) is known to the eNodeB. Thus, when the eNodeB receives an S1AP message from the MME, it can determine whether or not the targeted UE is link budget limited by determining whether or not the S-TMSI included in the S1AP message belongs to the reserved subset.

When the UE to be paged is determined to be LBL, the eNB can page the UE using any one or more of the paging enhancement mechanisms described herein. When the UE to be paged is determined to be non-LBL, the eNB can page the UE in a conventional fashion.

Figure 11:
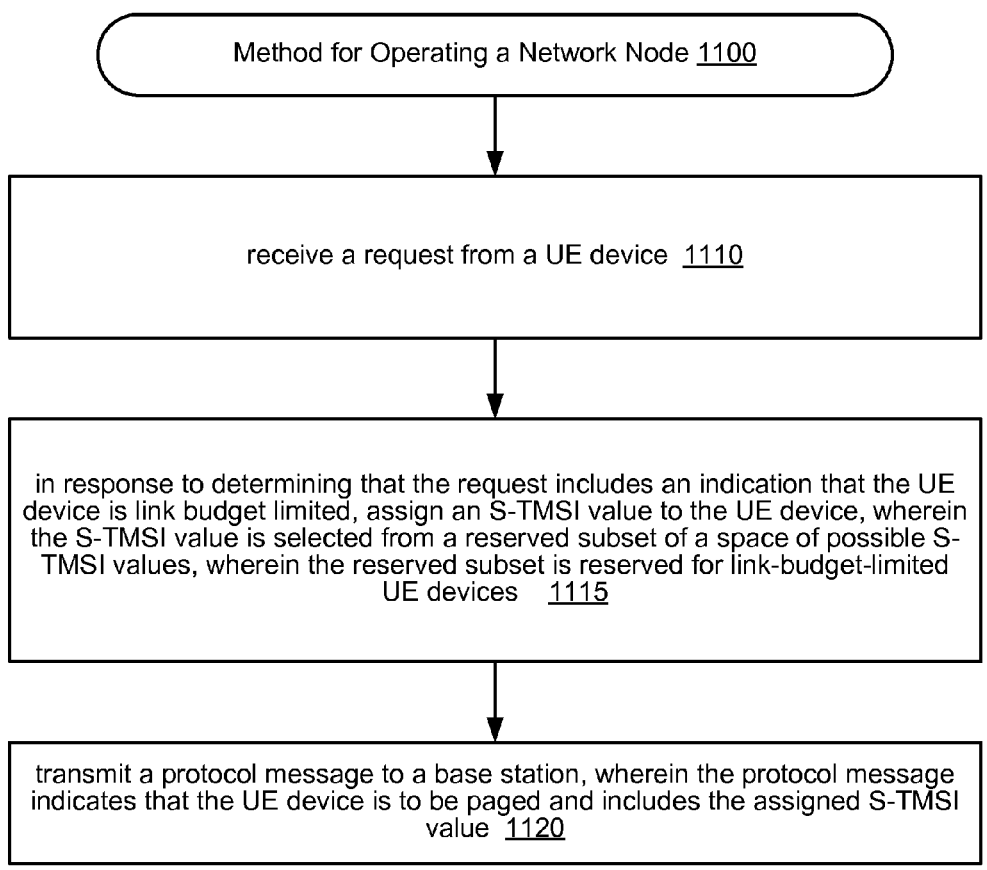
FIG. 11 illustrates a method according to some embodiments, for operating a network node in order to signal link-budget-limited status of a UE device as part of a paging message, involving the assignment of a temporary UE identifier from a reserved subset of a universe of possible values.

In one set of embodiments, a method 1100 for operating a node (e.g., a mobility management entity) in a communication network may be performed as shown in FIG. 11. (The method 1100 may also include any subset of the features, elements and embodiments described above in connection with FIGS. 1-10 and described below in connection with FIGS. 12-19.) The method 1100 may be performed in order to facilitate the successful completion of paging of one or more link-budget-limited UE devices. The method 1000 may be performed by a processing agent of the node. The processing agent may be realized by one or more processors executing program instructions, by one or more programmable hardware elements, by one or more dedicated hardware devices such as ASICs, or by any combination of the foregoing.

While method 1100 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1110, the network node may receive a request from a UE device. In some embodiments, the request may be a request for attachment to the network and/or a request for a tracking area update. The UE may transmit the request to the node via a base station of the communication network.

At 1115, in response to determining that the request includes an indication that the UE device is link budget limited, the network node may assign an S-TMSI value to the UE device, wherein the S-TMSI value is selected from a reserved subset of a space of possible S-TMSI values. The reserved subset is reserved for link-budget-limited UE devices. The UE device may indicate its link-budget-limited status in any of the various ways disclosed herein.

At 1120, the network node may transmit a protocol message to a base station, wherein the protocol message indicates that the UE device is to be paged and includes the assigned S-TMSI value. In some embodiments, the protocol message is transmitted to a plurality of base stations in a tracking area.

In some embodiments, the method 1100 may also include: (a) receiving a second request from a second UE device; (b) in response to determining that the second request does not include an indication that the second UE device is link budget limited (or includes an indication that the second UE device is not link budget limited), assigning a second S-TMSI value to the UE device, wherein the second S-TMSI value is selected from a set complement of the reserved subset; and (c) transmitting a second protocol message to the base station, wherein the second protocol message indicates that the second UE device is to be paged and includes the second S-TMSI value.

Figure 12:
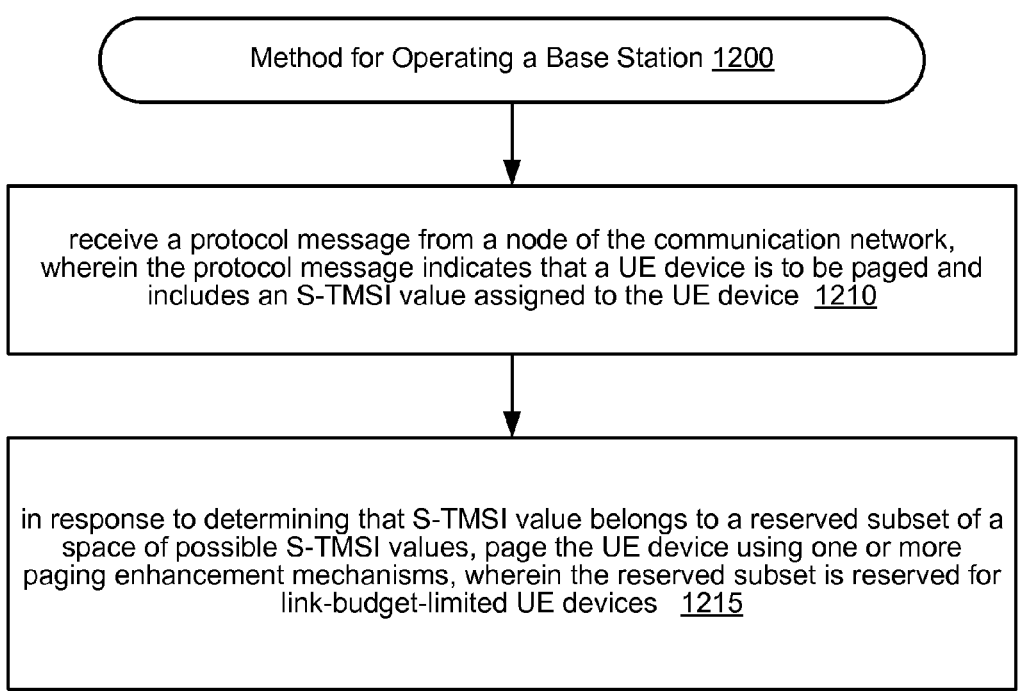
FIG. 12 illustrates a method according to some embodiments, for operating a base station in order determine the link-budget-limited status of a UE device based on a temporary UE identifier in a received paging message.

In one set of embodiments, a method 1200 for operating a base station may be performed as shown in FIG. 12. (The method 1200 may also include any subset of the features, elements and embodiments described above in connection with FIGS. 1-11 and described below in connection with FIGS. 13-19.) The method 1200 may be performed to facilitate the paging of a user equipment (UE) device that is link budget limited. The method may be performed by a processing agent of the base station. The processing agent may be realized by one or more processors executing program instructions, by one or more programmable hardware elements, by one or more dedicated hardware devices such as ASICs, or by any combination of the foregoing.

While method 1200 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1210, the base station may receive a protocol message from a node of the communication network, e.g., from an MME node. The protocol message indicates that a UE device is to be paged and includes an S-TMSI value assigned to the UE device.

At 1215, in response to determining that the S-TMSI value belongs to a reserved subset of a space of possible S-TMSI values, the base station may page the UE device using one or more paging enhancement mechanisms, e.g., any one or more of the paging enhancement mechanisms disclosed herein. The reserved subset is reserved for link-budget-limited UE devices.

In some embodiments, one of the paging enhancement mechanisms includes repeatedly transmitting a paging message to the UE device (e.g., as variously described above) until the UE device completes a random access procedure.

In some embodiments, one of the paging enhancement mechanisms includes transmitting a paging message to the UE device a plurality of times, e.g., a predetermined number of times.

In some embodiments, one of the paging enhancement mechanisms includes transmitting a paging message to the UE device with increased power relative to power used to transmit paging messages to non-link-budget-limited UE devices.

In some embodiments, the method 1200 may also include: receiving a second protocol message from the node of the communication network, wherein the second protocol message indicates that a second UE device is to be paged and includes a second S-TMSI value assigned to the second UE device; and in response to determining that the second S-TMSI value belongs to a set complement of the reserved subset, paging the second UE device without using any of the one or more paging enhancement mechanisms.

Paging Improvements for Link-Budget-Limited UE Devices

In one set of embodiments, different P-RNTIs may be used for LBL devices versus non-LBL devices. An LBL-specific P-RNTI may be used to page LBL devices. The LBL-specific P-RNTI is different from the conventional P-RNTI, which is used to page non-LBL devices. (The conventional P-RNTI may be the P-RNTI defined in the LTE specifications.) When transmitting a paging message to one or more LBL devices, the eNB may scramble at least a portion of the control channel elements (CCEs) that carry the paging control information in the PDCCH with the LBL-specific P-RNTI. The eNB may also boost the power of those paging CCEs relative to the power that would be used if non-LBL device(s) were being paged with the conventional P-RNTI.

In one set of embodiments, the eNB transmits paging messages to LBL devices using a pre-defined alternative set of paging occasions (POs), different from the conventional set of paging occasions configured by the eNB. (Paging messages for non-LBL devices are transmitted on the conventional set of paging occasions.) For example, for TDD operation, the alternative paging occasions may be $\{4,9\}$, and for FDD operation, the alternative paging occasions may be $\{1,6\}$. The NW may send an initial paging message on one of the alternative paging occasions in an initial frame number $SFN_0$, and then repeat the paging message transmission on the same paging occasion in each of frames $SFN_0+X$, $SFN_0+2X$, ..., $SFN_0+(Y-1)X$, where the number of transmissions Y is greater than one, and frame stride X is greater than or equal to one. (For example, in one embodiment, $X=8$ and $Y=4$.) (In some embodiments, each of the frames $SFN_0$, $SFN_0+X$, $SFN_0+2X$, $SFN_0+(Y-1)X$ may include a plurality of transmissions of the paging message, e.g., as variously described above.)

In some embodiments, the LBL device may attempt to decode the paging CCEs from the PDCCHs of the Y repetitions of the paging message. Upon successfully decoding the paging CCEs from the Y repetitions, the LBL device may decode the paging payload based on a combination of the paging payload from the Y PDSCHs of the Y respective repetitions. The eNB may transmit the same paging payload in the PDSCH of each of the Y repetitions. Furthermore, the PDSCH allocation for the paging payload may be fixed across the Y repetitions, i.e., fixed resource block offset, fixed PRB and fixed MCS.

In alternative embodiments, there may be no PDCCH allocation for paging, and PDSCH is fixed across POs and repetitions. For example, the base station may be configured so that none of the Y transmissions includes PDCCH paging control information. The location of payload in the PDSCH may be agreed upon by base station and LBL devices, and thus, need not be signaled in the PDCCH.

In one set of embodiments, the eNB may maintain the LBL devices in RRC connected state, but with C-DRX enabled (e.g., with 1.28 s C-DRX cycle), while the eNB may perform conventional idle-mode paging with non-LBL devices. (C-DRX is an optional feature in LTE. When C-DRX is enabled by the eNB, the UE monitors the PDCCH on predefined active subframes of the C-DRX cycle for uplink and/or downlink resource allocations, and then turns off the UE receiver during the sleep portion of the C-DRX cycle.) These embodiments may have an impact on power consumption and an impact on the network. Connected mode C-DRX uses more power than idle mode DRX, even if the DRX cycle is same because C-DRX typically has ON duration which is longer than that of idle mode DRX. Furthermore, to maintain the UE in C-DRX for a longer time implies that the NW has to keep RRC context for the UE for a longer time. This impacts eNodeB capacity as the eNodeB needs to store RRC context for more UEs.

In some embodiments, the eNB may operate without knowledge of whether the UE to be paged is LBL. In these embodiments, the eNB may count the number of S1AP paging messages (from the MME) for the same S-TMSI (or the same IMSI) due to MME retransmitting page messages for a UE. The eNB then can power boost the page messages starting from the Nth retransmission (e.g., N=3 or 4 or 5). This method benefits all UEs, but benefits most the LBL-type UEs.

Figure 13:
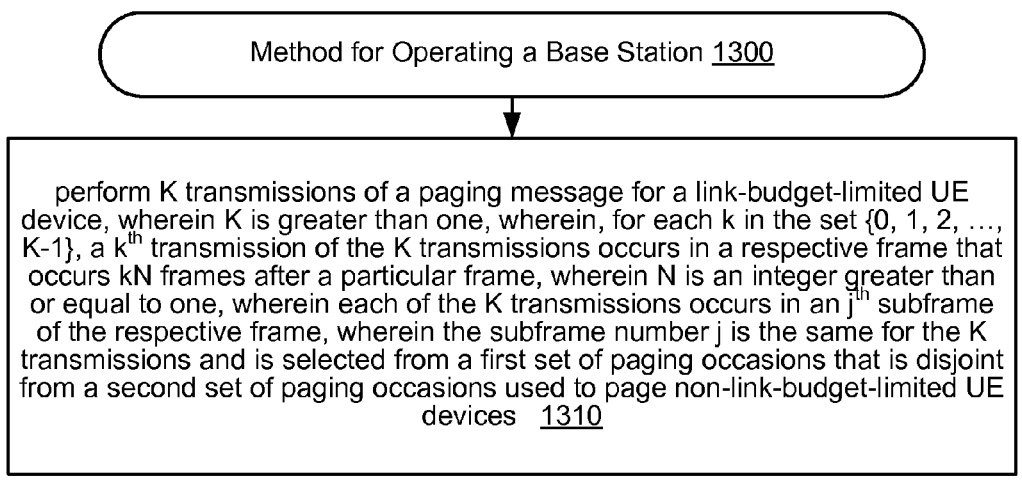
FIG. 13 illustrates a method according to some embodiments, for operating a base station in order to repeatedly transmit a paging message for an LBL device.

In one set of embodiments, a method 1300 for operating a base station may be performed as shown in FIG. 13. (The method 1300 may also include any subset of the features, elements and embodiments described above in connection with FIGS. 1-12 and described below in connection with FIGS. 14-19.) The method 1300 may be performed to facilitate the paging of a user equipment (UE) device that is link budget limited. The method may be performed by a processing agent of the base station. The processing agent may be realized by one or more processors executing program instructions, by one or more programmable hardware elements, by one or more dedicated hardware devices such as ASICs, or by any combination of the foregoing.

While method 1300 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1310, the base station may perform K transmissions of a paging message for a link-budget-limited UE device, wherein K is greater than one. For each k in the set $\{0, 1, 2, \ldots, K-1\}$, a $k^{th}$ transmission of the K transmissions may occur in a respective frame that occurs kN frames after a particular frame in a sequence of frames being transmitted in the downlink signal. (In the case k=0, the $k^{th}$ transmission is initial transmission and occurs in the particular frame itself.) N is an integer greater than or equal to one. Each of the K transmissions occurs in a $j^{th}$ subframe of the respective frame. The subframe number j may be the same for the K transmissions, and may be selected from a first set of paging occasions that is disjoint from a second set of paging occasions used to page non-link-budget-limited UE devices.

In some embodiments, the operation 1310 may be performed in response to a determination (or verification) that the UE device is link budget limited. Any of the various mechanisms described herein may be used to perform this determination.

In some embodiments, the paging message may include paging control information and paging payload information. For each of the K transmissions:
  the paging control information may be included (e.g., encoded) in a control channel of the $j^{th}$ subframe of the respective frame; and
  the paging payload information may be included (e.g., encoded) in a shared channel of the $j^{th}$ subframe of the respective frame.

In some embodiments, transmission power of the paging control information may be boosted relative to transmission power of paging control transmitted to the non-link-budget-limited UE devices. In some embodiments, transmission power of the paging payload information may be boosted relative to transmission power of paging payload transmitted to the non-link-budget-limited UE devices.

In some embodiments, the set of resources used to carry the paging payload information in each shared does not change over the K transmissions.

As noted above, the paging message may include paging control information and paging payload information. In some embodiments, for each of the K transmissions, the paging payload information may be transmitted using the same modulation-and-coding scheme (MCS).

Figure 14:
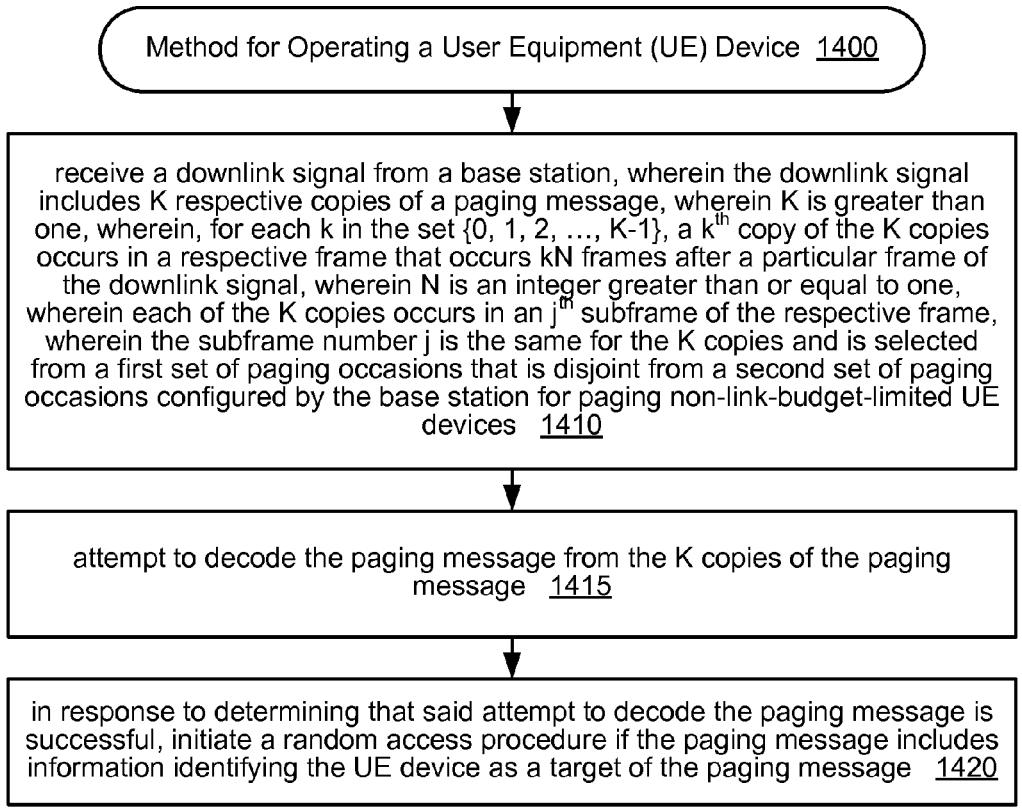
FIG. 14 illustrates a method according to some embodiments, for receiving a paging message that is repeatedly transmitted by a base station.

In one set of embodiments, a method 1400 for operating a user equipment (UE) device may be performed as shown in FIG. 14. (The method 1400 may also include any subset of the features, elements and embodiments described above in connection with FIGS. 1-13 and described below in connection with FIGS. 15-19.) The method 1400 may be performed by a UE device that is link budget limited, in order to facilitate paging of the UE device. The method 1400 may be performed by a processing agent of the UE device. The processing agent may be realized by one or more processors executing program instructions, by one or more programmable hardware elements, by one or more dedicated hardware devices such as ASICs, or by any combination of the foregoing.

While method 1400 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1410, the UE device may receive a downlink signal from a base station, where the downlink signal includes K respective copies of a paging message, where K is greater than one. For each k in the set $\{0, 1, 2, \ldots, K-1\}$, a $k^{th}$ copy of the K copies may occur in a respective frame that occurs kN frames after a particular frame of the downlink signal, where N is an integer greater than or equal to one. (The k=0 copy is the original paging message and occurs in the particular frame itself.) Each of the K copies occurs in a $j^{th}$ subframe of the respective frame. The subframe number j may be the same for the K copies, and may be selected from a first set of paging occasions that is disjoint from a second set of paging occasions configured by the base station for paging non-link-budget-limited UE devices.

At 1415, the UE device may attempt to decode the paging message from the K copies of the paging message, e.g., based on a combination of the K copies. Any of a variety of soft combining and/or hard combining techniques may be employed.

At 1420, in response to determining that the attempt to decode the paging message is successful, the UE device may initiate a random access procedure if the paging message includes information (e.g., an IMSI) identifying the UE device as a target of the paging message.

Each of the K copies of the paging message may be captured from a respective subframe of the downlink signal, where the respective subframe includes a PDCCH and a PDSCH. Thus, each copy of the paging message may include a respective PDCCH portion including the paging control information of the paging message, and a respective PDSCH portion including the paging payload information of the paging message. In some embodiments, the action of attempting to decode the paging message may include: (a) attempting to decode the paging control information of the paging message based on the PDCCH portions of the K respective copies of the paging message; and (b) in response to determining that the paging control information is successfully decoded, attempting to decode paging payload information of the paging message based on the PDSCH portions of the K respective copies of the paging message.

In some embodiments, the paging message includes paging control information and paging payload information, e.g., as variously described above. In one or more of these embodiments, for each of the K respective copies of the paging message, a set of resources used to carry the paging payload information in the $j^{th}$ subframe of the respective frame may remain constant over the K respective copies.

Paging of Link Budget Limited Devices with Power Boost

In one set of embodiments, a cellular network may be configured to selectively boost the power of paging messages to a given UE, e.g., after a certain number of failures of previous paging messages. In some situations, the eNB (base station) cannot or does not determine that a UE to be paged is a link-budget-limited device. Such a situation may occur, e.g., when the UE has not registered and indicated to the network that the UE is a link-budget-limited device. Furthermore, when the UE is in idle mode, the base station may not have context information for individual UEs. This context information may be available only after RRC connection setup by the UE. (After RRC connection, the base station has an RRC context for the UE which established the RRC connection.) When the UE does attach to the cellular network, the UE may establish an RRC connection with a base station in order to transmit an attach message to the MME and complete the attach procedure with MME. When the RRC connection is released, the base station may eventually (after a timeout) release its RRC context for the UE.

In this situation where the base station does not know the class of the UE (does not know whether it is link budget limited), the base station may page the UE using a standard P-RNTI (Radio Network Temporary Identifier). The base station may detect the number of pages that are being made to the UE, e.g., due to paging failures. More specifically, the base station may detect the number of S1AP messages from the MME (Mobile Management Entity) for the same page ID. One or more of these paging messages may occur due to the MME having to retransmit page messages to the UE because the UE has not responded to prior page messages, e.g., for an incoming call.

As an example, the MME may transmit a paging message for a particular UE, where the base station receives this paging message and transmits it to the UE, e.g., for a first incoming call. If the UE is link budget limited (or otherwise is in a poor communication scenario), the UE may not receive the paging message and hence will not respond. Due to this non-response (and possibly after a timeout period for response), the MME may retransmit another paging message for the particular UE to the base station, which is then transmitted by the base station to the UE, to again signal the incoming call. Again, due to the link-budget-limited nature of the UE, the UE may not receive, and hence may not respond to, the paging message.

In at least some embodiments, the MME may send an idle mode page message to all base stations (eNodeBs) in a tracking area. The page message may be an S1 AP message, where S1 is the link between the MME and eNodeB. The S1 AP message may include only the paged UE, the message content may comprise:
1) UE_ID which is UE IMSI mod 1024, and CDRX length, these two are used by the base station to calculate page SFN and PO.
2) UE page id is either S-TMSI allocated by MME during attach, or IMSI. The UE page id is directly passed to the RRC page message sent to UE on radio.

After the MME sends the S1 AP page message to the base station, it starts a timer. If after timeout the MME does not receive a page response from the UE, it will retransmit the S1 AP page message for N times. (In one example network configuration, the number N is greater than 5.)

The base station can detect that a UE is being paged multiple times by the MME due to MME retransmissions. This can be detected by checking if received page messages have the same UE page id as the previously received message. For example, if the UE has been paged N times in the last T time, (for example N is 3, T is 20 seconds), and the newly received page message is the same UE page ID, then the base station can incrementally power boost the subframe on PDCCH and PDSCH where the page message is transmitted. For example, if the MME pages a UE 5 times, the first three times, the base station may send the page message normally without specific power boost; however, the last two times, the base station may power boost the page messages.

In at least some embodiments, the base station may detect that the paging message has not been received by the UE for a certain number N of paging attempts (e.g., where N=2 or 3 or 4 or 5 or 6). For example, as noted above, the base station may detect paging failures by detecting new paging messages for the same UE transmitted by the MME, e.g., by detecting the same UE identifying information on these new paging messages. Thus, the base station may detect that the previous N paging attempts may have been unsuccessful (not received by the UE) when a $N+1^{st}$ paging attempt is received from the MME for the UE. In this case, the base station may be configured to "power boost" the subsequent page messages to this particular UE, i.e., may boost (increase) the power for the $N+1^{st}$ page message onward. More specifically, the base station may boost (increase) the transmit power of one or both of the PDCCH (Physical Downlink Control Channel) and the PDSCH (Physical Downlink Shared Channel) to help ensure that these subsequent paging messages are successfully received by the UE.

The base station may continue to transmit these subsequent paging attempts using the same boosted power level until the page is successfully received by the UE or paging is abandoned (e.g., after M additional attempts, such as three). In some embodiments, the base station may be configured to increase the amount of power boost (increase the amount of increased power) for each subsequent retransmission of the paging message until either the paging message has been received and responded to, or until a certain threshold of paging attempts has been reached. For example, after N transmission failures, on the N+1 paging message transmission the base station may increase the transmission power of the page message transmission (e.g., increase the transmit power of PDCCH and/or PDSCH) by a first factor (e.g., 1.2× power) relative to a baseline power. If the UE does not respond to this paging message, the base station may increase the transmission power of the page message transmission by a second factor (e.g., 1.4× power) relative to the baseline power. The base station may continue to increase the transmit power of the paging message until a certain threshold number M of paging attempts have been made (e.g., M=3, 4, 5, 6, 7) after which the base station discontinues any further attempt to page the UE.

The above method may provide benefits to various classes of UE's, including both link budget limited UEs and other UE's that are not inherently link budget limited, but which may be in a poor communication scenario. Thus embodiments described herein may be used for non-link budget limited devices (or "normal" devices), such as standard cell phones, tablet devices, etc. At least some embodiments may provide the greatest benefit to link budget limited UEs, since link budget limited UEs are often downlink (DL) limited.

In situations where the base station is able to determine that a particular UE is a link budget limited UE based on the UE identifying information, then the base station may begin to increase the power of the paging message transmission sooner, e.g., after a lesser number of failures. For example, in the above example the base station may begin boosting the power of the paging message transmission after N failed paging transmissions, where N is, e.g., 3. Where the base station knows that the UE is link budget limited, the base station may begin to increase the power of the paging message transmission after Y failed paging transmissions, where Y is less than N, e.g., 1.

This method may benefit all UEs in the network, but will benefit DL limited (link budget limited) UEs the most. Normal UEs will typically receive the page in the first or second transmission, which does not need a power boost. For a DL limited UE or UE at the cell edge, the UE will likely miss the first 3 transmissions, but they will have a greater chance to decode the fourth or fifth transmission, since they are power boosted by the base station.

Figure 15:
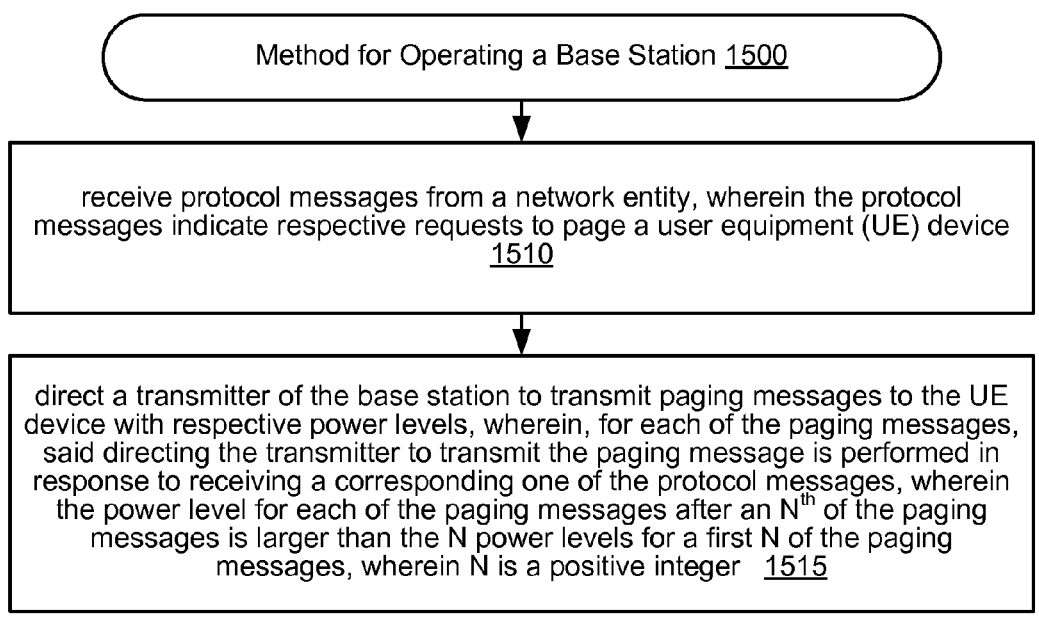
FIG. 15 illustrates a method according to some embodiments, for operating a base station in order to boost transmission power of paging messages transmitted to a UE device after N protocol message have been received from a network node or after N previous transmission failures.

In one set of embodiments, a method 1500 for operating a base station may be performed as shown in FIG. 15. (The method 1500 may also include any subset of the features, elements and embodiments described above in connection with FIGS. 1-14 and described below in connection with FIGS. 16-19.) The method 1500 may be performed to facilitate successful completion of paging procedure by a user equipment (UE) device that is link budget limited. The method 1500 may be performed by a processing agent of the base station. The processing agent may be realized by one or more processors executing program instructions, by one or more programmable hardware elements, by one or more dedicated hardware devices such as ASICs, or by any combination of the foregoing.

While method 1500 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1510, the processing agent may receive protocol messages from a network entity (e.g., from an MME), where the protocol messages indicate respective requests to page a user equipment (UE) device. One or more of the protocol messages may have been sent in response to the failure of one or more respective previous requests to page the UE device. If the MME determines that a given request, corresponding to a given protocol message, results in paging failure, then the MME may transmit another protocol message, representing a further request to the page the UE device. A succession of protocol messages targeting the same UE device (e.g., within a predetermined window in time) may represent repeated failures to page that UE device.

At 1515, the processing agent may direct a transmitter of the base station to transmit paging messages to the UE device with respective power levels. For each of the paging messages, the action of directing the transmitter to transmit the paging message may be performed in response to receiving a corresponding one of the protocol messages. The power level for each of the paging messages after an $N^{th}$ of the paging messages may be larger than the N power levels for the first N of the paging messages, wherein N is a positive integer. By directing the transmitter to transmit each paging message after the $N^{th}$ paging message with the larger power level(s), the base station may increase the likelihood that any link-budget-limited UE device(s) in the cell will be able to successfully decode the paging message.

The action of directing the transmitter to transmit with a given power level means that the processing agent or other controlling agent indicates (or specifies) the power level to be used for the transmission, but not necessarily that the indicated power level is perfectly realized in terms of actual transmit power.

In some embodiments, the method 1500 may also include determining that the protocol messages occur within a temporal window starting at an arrival time of a first of the protocol messages, wherein the temporal window has a predetermined temporal width. The temporal width may be sufficiently small to make it likely that each of the protocol messages after the first protocol message and occurring within the window is due to failure of the paging message associated with a previous one of the protocol messages.

In some embodiments, the N power levels of the first N paging messages may be identical, i.e., equal to a common value or baseline value.

In some embodiments, the integer N is greater than one. For example, in some embodiments, N may equal 2, 3, 4, 5, 6, 7, 8, 9 or 10.

In some embodiments, the network entity is a Mobility Management Entity (MME) of an LTE network, wherein the protocol message is an S1 AP message.

In some embodiments, the power level increases for each successive paging message after the $N^{th}$ of the paging messages.

In some embodiments, the method 1500 may also include: (a) maintaining a count of the paging messages that have been previously transmitted to the UE device; and (b) comparing the count to the positive integer N in order to determine the power level for a current one of the paging messages.

In some embodiments, the method 1500 may also include (a) maintaining a count of the number of said protocol messages that have been received; and (b) comparing the count to a threshold that depends on the positive integer N in order to determine the power level for a current one of the paging messages.

In one set of embodiments, a base station for paging one or more UE devices may be configured as follows. The base station may include: at least one radio coupled to an antenna subsystem; and a processing element coupled to the at least one radio. (The base station may also include any subset of the features, elements and embodiments described above in connection with FIGS. 1-14 and described below in connection with FIGS. 16-19.) The processing element may be configured to transmit, via the at least one radio, one or more first paging messages to a first user equipment (UE) device, wherein the one or more first paging messages are transmitted with a first transmit power. The processing agent may be further configured to transmit, via the at least one radio, one or more additional paging messages, wherein the one or more additional paging messages are transmitted with a higher transmit power than the first transmit power, wherein transmission of the one or more paging messages to the first UE device occurs with the higher transmit power in response to failure of the first UE device to respond to the one or more first paging messages.

In some embodiments, the base station is configured to transmit a plurality of the additional paging messages to the first UE device up until a threshold number of paging messages.

In some embodiment, the base station is configured to boost a transmit power for each successive one of the plurality of additional paging messages to the first UE device.

MME Initiation of Paging Procedure in LTE

In LTE, the purpose of the paging procedure is to enable the MME to page a UE through an eNB. The MME initiates the paging procedure by sending a page message to the eNB. The page message may be an S1AP message. (S1AP is an acronym for S1 Application Protocol.) Upon receiving the paging message, the eNB pages the UE in cells which belong to tracking areas indicated in the "List of Tracking Area Identifiers (TAIs)" information element.

For each cell that belongs to any of the Tracking Areas (TAs) indicated in the List of TAIs IE, the eNB generates a page on the radio interface.

A "Paging DRX" information element (IE) may be included in the paging message. According to 3GPP TS 36.304, if the Paging DRX IE is present in the paging message, the eNB sets the DRX cycle value equal to the minimum of the default DRX cycle value in the eNB and the DRX cycle value indicated in the Paging DRX IE.

UE-Specified DRX Setting in TAU and Attach Requests, According to LTE

In LTE, as part of a Tracking Area Update (TAU) request or an Attach request, the UE can send a DRX value to the MME. The MME stores the DRX value, and uses that DRX value when paging the UE. In particular, the UE-specified DRX value is included in the S1 AP paging message sent to the eNB. According to 3GPP TS 24.301:

"If the UE specific DRX parameter was included in the DRX Parameter IE in the ATTACH REQUEST message, the MME shall replace any stored UE specific DRX parameter with the received parameter and use it for the downlink transfer of signaling and user data."

"If the UE specific DRX parameter was included in the DRX Parameter IE in the TRACKING AREA UPDATE REQUEST message, the network shall replace any stored UE specific DRX parameter with the received parameter and use it for the downlink transfer of signaling and user data."

According to 3GPP TS 24.008, section 10.5.5.6 and Table 10.5.139, the possible DRX values that can be set in TAU and ATTACH are defined as follows. One of the octets in the "DRX parameter" information element includes a four bit field that contains information related to DRX cycle. This field represents two separate values. For 1u mode, it represents the "CN domain specific DRX cycle length" as defined in 3GPP TS 25.331. For S1 mode, it represents the DRX cycle parameter T as defined in 3GPP TS 36.304.

TABLE

Field for DRX Cycle Length/DRX Cycle Parameter T

| Bit Number (within Octet) | | | | Interpretation |
|---|---|---|---|---|
| 8 | 7 | 6 | 5 | Iu and S1 mode specific |
| 0 | 0 | 0 | 0 | For Iu mode, CN Specific DRX cycle length coefficient not specified by the MS, ie., the system information value 'CN domain specific DRX cycle length' is used. For S1 mode, DRX value not specified by the MS. |
| 0 | 1 | 1 | 0 | CN Specific DRX cycle length coefficient 6 and T = 32. |
| 0 | 1 | 1 | 1 | CN Specific DRX cycle length coefficient 7 and T = 64. |
| 1 | 0 | 0 | 0 | CN Specific DRX cycle length coefficient 8 and T = 128. |
| 1 | 0 | 0 | 1 | CN Specific DRX cycle length coefficient 9 and T = 256. |

According to TS 36.304, all other values of the four-bit field are interpreted as "CN Specific DRX cycle length coefficient not specified by the MS" and "DRX value not specified by the MS" by this version of the protocol. (MS is an acronym for Mobile Station.)

LBL Identification via Special DRX Cycle Value

In one set of embodiments, an LBL device, as part of the tracking area update (TAU) and/or attach request can send a particular value of the DRX cycle to the MME as a signal of its status as an LBL device. (The particular value may be a value not used or not commonly used by current LTE-compliant UE devices.) The MME stores the DRX cycle value received from the LBL device, and sends it to the eNB as part of the S1AP paging message. The eNB may be configured to recognize the particular value of the DRX cycle as a signal that the UE to be paged is an LBL device. Thus, when paging the UE, the eNB may invoke one or more of the LBL-specific paging enhancement mechanisms described herein. For example, the eNB may:

selectively boost the transmit power of the PDCCH and/or PDSCH in the subframe(s) carrying the paging message; and/or repeat the transmission of the page message one or more times, if needed, to enable the UE to combine received paging data records over a plurality of transmissions.

If an S1AP message includes a DRX cycle value that is different from the particular value, or if the S1AP message does not include a DRX cycle value, the eNB may page the targeted UE without using any of the LBL-specific paging enhancement mechanisms.

In some embodiments, the eNB and UE may be configured to use the default DRX cycle of the cell for idle mode paging of the UE, regardless of the DRX cycle value included in the S1AP message. For example, the eNB and the UE may simply ignore the minimum calculation mandated by TS 36.304, and directly set the DRX cycle value equal to the default value. Thus, in cases where the DRX cycle value in the S1AP message is less than the default DRX cycle value, the eNB and UE would still use the default DRX cycle value.

In other embodiments, the eNB and UE may be configured to respect the minimum calculation specified in TS 36.304 for determining the DRX cycle value for idle mode paging of the UE. (The minimum calculation requires the DRX cycle to be the minimum of the default DRX cycle value and the UE-specific DRX cycle value given in the S1 AP message.)

Figure 16:
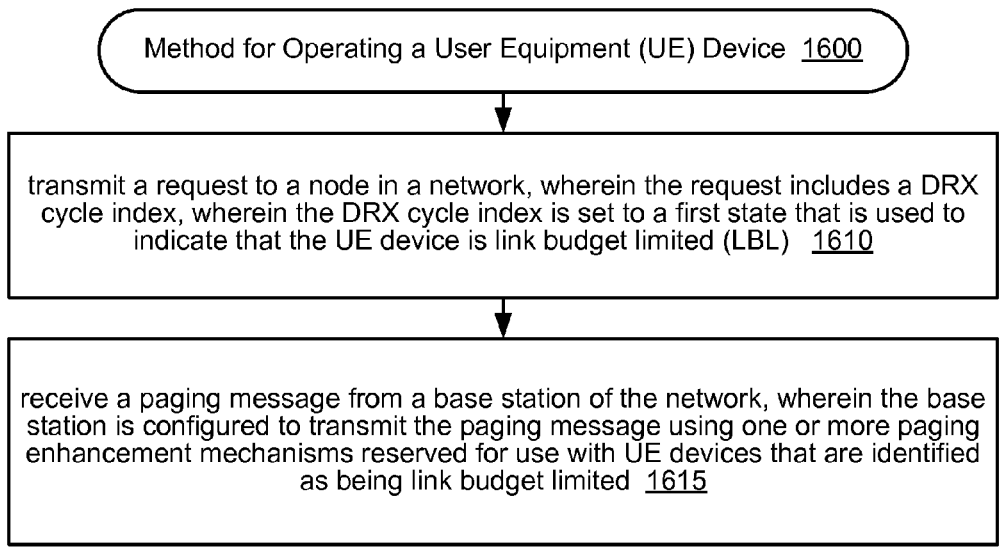
FIG. 16 illustrates a method according to some embodiments, enabling a link-budget-limited UE device to signal its status as an LBL device to a node in a wireless network, involving the transmission of a special value of DRX cycle.

In one set of embodiments, a method 1600 for operating a user equipment (UE) device may be performed as shown in FIG. 16. (The method 1600 may also include any subset of the features, elements and embodiments described above in connection with FIGS. 1-15 and described below in connection with FIGS. 17-19.) The method 1600 may be performed by a UE device that is link budget limited. The method 1600 may be performed by a processing agent of the UE device. The processing agent may be realized by one or more processors executing program instructions, by one or more programmable hardware elements, by one or more dedicated hardware devices such as ASICs, or by any combination of the foregoing.

While method 1600 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1610, the UE device may transmit a request to a node in a network, wherein the request includes a DRX cycle index, wherein the DRX cycle index is set to a first state that is used to indicate that the UE device is link budget limited (LBL).

At 1615, the UE device may receive a paging message from a base station of the network, wherein the base station is configured to transmit the paging message using one or more paging enhancement mechanisms reserved for use with UE devices that are identified as being link budget limited. The one or more paging enhancement mechanisms may be any of the paging enhancement mechanisms disclosed herein.

In some embodiments, the base station is further configured to: (a) receive a protocol message from the network node, wherein the protocol message indicates that the UE device is to be paged and includes the DRX cycle index; and (b) in response to determining that the DRX cycle index in the protocol message equals the first state, transmit the paging message using the one or more paging enhancement mechanisms.

In some embodiments, four or more possible states of the DRX cycle index correspond respectively to four or more values of DRX cycle, wherein the first state of the DRX cycle index is equal to one of the four or more states.

In some embodiments, the first state corresponds to a maximal one or a minimal one of the four or more DRX cycle values.

In some embodiments, a format of the DRX cycle index conforms to the LTE standard (e.g., GPP TS 24.008). In these embodiments, the first state may correspond to one of the four or more DRX cycle values that is not commonly used by conventional user equipment devices conforming to the LTE standard.

In some embodiments, in at least one mode of operation of the UE device, the four or more values of DRX cycle include the values 32, 64, 128 and 256.

In some embodiments, the "DRX parameter" information element of LTE may be extended so that the available values of DRX cycle include one or more values of DRX cycle larger than currently available values. The above-described first state may be a state corresponding to one of these larger values.

In some embodiments, a second UE device that is link budget limited is configured to use the first state of the DRX cycle index as a signal of its status as a link-budget-limited device when transmitting tracking area updates and/or attach requests to the network.

In some embodiments, a second UE device that is not link budget limited is configured so that it never uses the first state of the DRX cycle index when transmitting tracking area updates and/or attach requests to the network.

In some embodiments, the request is a request for attachment to the network and/or a request for tracking area update.

In some embodiments, the network node is a Mobility Management Entity (MME). In some embodiments, the network node is an MME conforming to the LTE standard.

In some embodiments, a first of the one or more paging enhancement mechanisms includes the base station performing a plurality of transmissions of the paging message. In these embodiments, the action of receiving the paging message from the base station may include: (a) receiving data records corresponding respectively to the plurality of transmissions of the paging message; and (b) decoding the paging message based on a combination of the data records.

In some embodiments, the plurality of transmissions of the paging message occur within a paging cycle (i.e., a DRX cycle).

In some embodiments, a first of the transmissions of the paging message occurs in a paging frame, wherein successive ones of the transmissions are spaced a fixed number of frames apart.

Figure 17:
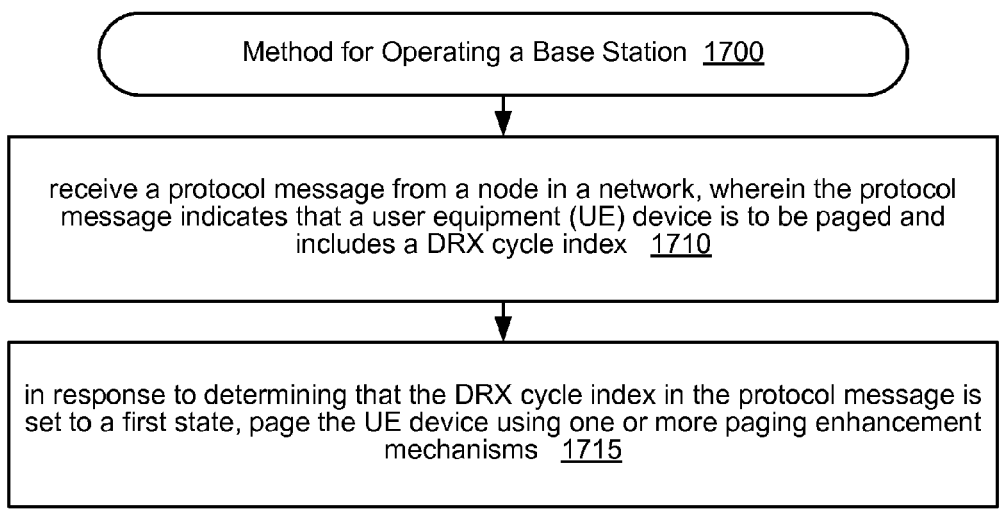
FIG. 17 illustrates a method according to some embodiments, enabling a base station to recognize the LBL status of a UE device to be paged based on the presence of a special DRX cycle value in a received paging message.

In one set of embodiments, a method 1700 for operating a base station may be performed as shown in FIG. 17. (The method 1700 may also include any subset of the features, elements and embodiments described above in connection with FIGS. 1-16 and described below in connection with FIGS. 18-19.) The method 1700 may be performed to facilitate the paging of a user equipment (UE) device that is link budget limited. The method may be performed by a processing agent of the base station. The processing agent may be realized by one or more processors executing program instructions, by one or more programmable hardware elements, by one or more dedicated hardware devices such as ASICs, or by any combination of the foregoing.

While method 1700 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1710, the base station may receive a protocol message from a node in a network, wherein the protocol message indicates that a user equipment (UE) device is to be paged and includes a DRX cycle index.

At 1715, in response to determining that the DRX cycle index in the protocol message is set to a first state, the base station may page the UE device using one or more paging enhancement mechanisms. The paging enhancement mechanisms may be reserved for use with UE devices that are link budget limited. The one or more paging enhancement mechanisms may be any of the paging enhancement mechanisms disclosed herein.

In some embodiments, the node is a Mobility Management Entity (MME), wherein the protocol message is an S1AP message.

In some embodiments, one of the paging enhancement mechanisms includes repeatedly transmitting a paging message to the UE device until the UE device completes a random access procedure.

In some embodiments, one of the paging enhancement mechanisms includes transmitting a paging message to the UE device a plurality of times.

In some embodiments, one of the paging enhancement mechanisms includes transmitting a paging message to the UE device with increased power relative to power used to transmit paging messages to non-LBL devices.

In some embodiments, four or more possible states of the DRX cycle index correspond respectively to four or more values of DRX cycle, wherein the first state of the DRX cycle index is equal to one of the four or more states.

In some embodiments, the first state corresponds to a maximal one of the four or more DRX cycle values.

In some embodiments, the first state corresponds to a minimal one of the four or more DRX cycle values.

In some embodiments, the DRX cycle index conforms to the LTE standard.

In some embodiments, the first state corresponds to one of the four or more DRX cycle values that is not commonly used by conventional LTE-conforming user equipment devices when performing tracking area updates and attach requests.

In some embodiments, the method 1700 may also include: (a) receiving a second protocol message from the network node, wherein the second protocol message indicates that a second user equipment (UE) device is to be paged and includes a second DRX cycle index; and (b) in response to determining that the second DRX cycle index in the second protocol message is set to a value different from the first state, paging the second UE device without using any of the one or more paging enhancement mechanisms.

In some embodiments, the action of paging the UE device includes periodically transmitting the paging message to the UE device.

In some embodiments, a period of said periodically transmitting is equal to a minimum of: a DRX cycle value corresponding to the first state of the DRX cycle index; and a default DRX cycle value of a cell corresponding to the base station.

In some embodiments, a period of said periodically transmitting is equal to a default DRX cycle value of a cell corresponding to the base station regardless of the state of the DRX cycle index in the protocol message.

In some embodiments, the action of periodically transmitting the paging message includes transmitting the paging message a predetermined number of times, wherein the predetermined number is greater than one.

In some embodiments, the action of periodically transmitting the paging message includes repeatedly transmitting the paging message until a random access procedure initiated by the UE device is completed.

Signal Device Status Via Flag

Figure 18:
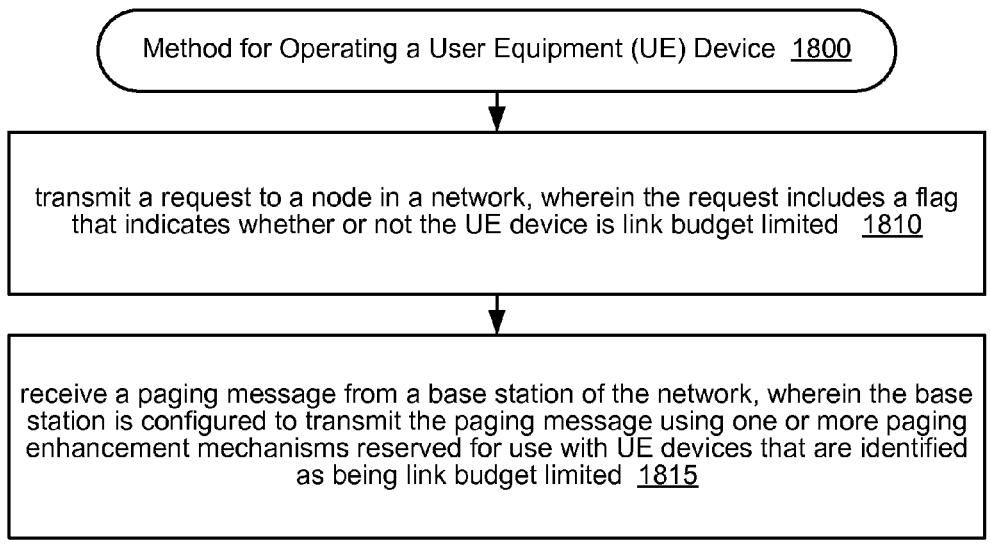
FIG. 18 illustrates a method according to some embodiments, enabling a link-budget-limited UE device to signal its status of being LBL to a node in a wireless network, involving the inclusion of a status-signaling flag as part of a tracking area update and/or attached request.

In one set of embodiments, a method 1800 for operating a user equipment (UE) device may be performed as shown in FIG. 18. (The method 1800 may also include any subset of the features, elements and embodiments described above in connection with FIGS. 1-17 and described below in connection with FIG. 19.) The method 1800 may be performed by a processing agent of the UE device. The processing agent may be realized by one or more processors executing program instructions, by one or more programmable hardware elements, by one or more dedicated hardware devices such as ASICs, or by any combination of the foregoing.

While method 1800 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1810, the UE device may transmit a request to a node in a network, wherein the request includes a flag that indicates whether or not the UE device is link budget limited. In some embodiments, the flag may be realized by a Boolean element or an enumeration element.

In some embodiments, the LTE specifications may be extended to include the flag as a new information element. The new information element may be included as part of a tracking area update, or as part of an attach request, or both. Alternatively, one of the existing information elements in LTE may be extended to include the flag as an additional field. For example, the "DRX parameter" information element of 3GPP TS 24.008 may be extended by adding the flag to the existing fields in that information element.

At 1815, the UE device may receive a paging message from a base station of the network, wherein the base station is configured to transmit the paging message using one or more paging enhancement mechanisms reserved for use with UE devices that are identified as being link budget limited.

In some embodiments, the base station is configured to: (a) receive a protocol message from the network node, wherein the protocol message indicates that the UE device is to be paged and includes the flag indicating whether or not the UE device is link budget limited; and (b) in response to determining that the flag is equal to a first state corresponding to link budget limited status, page the UE device using the one or more paging enhancement mechanisms.

In some embodiments, the UE device is link budget limited, wherein the flag is set to a first state that indicates that the UE device is link budget limited.

In some embodiments, the request is a request for attachment to the network and/or a request for tracking area update.

In some embodiments, a first of the one or more paging enhancement mechanisms includes the base station performing a plurality of transmissions of the paging message. In these embodiments, the action of receiving the paging message from the base station may include: (a) receiving data records corresponding respectively to the plurality of transmissions of the paging message; and (b) decoding the paging message based on a combination of the data records.

In some embodiments, the plurality of transmissions of the paging message may occur within a paging cycle, e.g., as variously described above.

In some embodiments, a first of the transmissions of the paging message occurs in a paging frame, wherein successive ones of the transmissions are spaced a fixed number of frames apart, e.g., as variously described above.

In one set of embodiments, a node in a wireless network may operate as follows in order to facilitate the paging of a UE device that is link budget limited. The node may include a processing agent. The processing agent may be realized by one or more processors executing program instructions, by one or more programmable hardware elements, by one or more dedicated hardware devices such as ASICs, or by any combination of the foregoing. (The node may also include any subset of the features, elements and embodiments described above in connection with FIGS. 1-18 and described below in connection with FIG. 19.)

The node may receive a request (e.g., a request for attachment to the network and/or a request for a tracking area update) from a UE device. The request includes a flag indicating whether or not the UE device is link budget limited. In response an indication that the UE device needs to be paged, the node may send a protocol message to a base station or to a plurality of base stations in a tracking area). The node transmits an LBL-status flag indicating whether or not the UE device is link budget limited. The LBL status flag agrees with the flag received in the request from the UE device. If the request also includes a DRX cycle index, the node may transmit the DRX cycle index as part of the protocol message.

In some embodiments, the LTE specifications may be extended so that the S1 AP message (from MME to eNB) includes the above-described LBL-status flag. The above-mentioned protocol message may be realized by such an extended S1 AP message.

Figure 19:
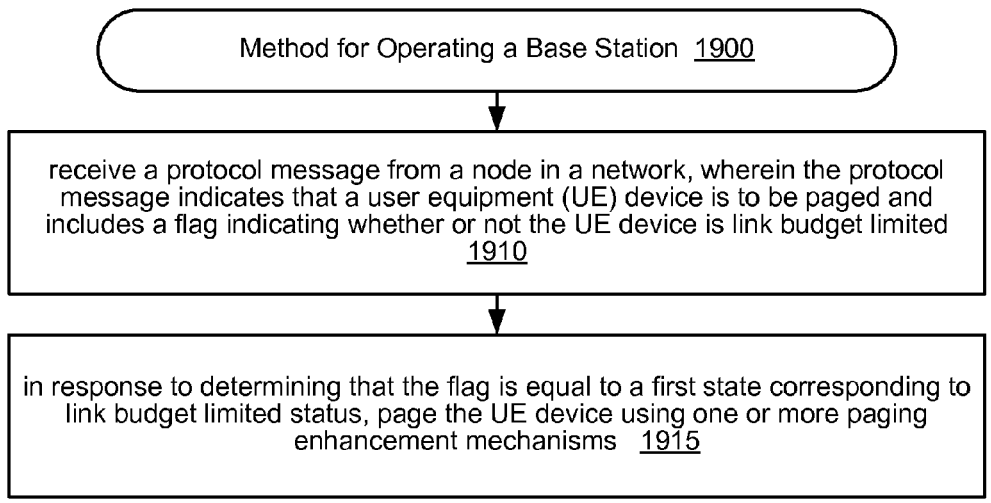
FIG. 19 illustrates a method according to some embodiments, enabling a base station to determine the LBL status of a UE device to be based on the presence of a status-signaling flag in a received paging message.

In one set of embodiments, a method 1900 for operating a base station may be performed as shown in FIG. 19. (The method 1900 may also include any subset of the features, elements and embodiments described above in connection with FIGS. 1-18.) The method 1900 may be performed to facilitate the paging of a user equipment (UE) device that is link budget limited. The method may be performed by a processing agent of the base station. The processing agent may be realized by one or more processors executing program instructions, by one or more programmable hardware elements, by one or more dedicated hardware devices such as ASICs, or by any combination of the foregoing.

While method 1900 is described below in terms of a number of steps, it should be understood that in various embodiments: one or more of the steps may be omitted; two or more of the steps may be performed at least partially in parallel; one or more steps may be added, as desired; and the steps may be performed in different orders than that described.

At 1910, the base station may receive a protocol message from a node in a network, wherein the protocol message indicates that a user equipment (UE) device is to be paged and includes a flag indicating whether or not the UE device is link budget limited.

At 1915, in response to determining that the flag is equal to a first state corresponding to link budget limited status, the base station may page the UE device using one or more paging enhancement mechanisms.

In some embodiments, the node is a Mobility Management Entity (MME), wherein the protocol message is an S1AP message.

In some embodiments, a first of the one or more paging enhancement mechanisms includes repeatedly transmitting a paging message to the UE device until the UE device completes a random access procedure.

In some embodiments, a first of the one or more paging enhancement mechanisms includes transmitting a paging message to the UE device a plurality of times.

In some embodiments, a first of the one or more paging enhancement mechanisms includes transmitting a paging message to the UE device with increased power relative to power used to transmit paging messages to non-LBL devices.

In some embodiments, the method 1900 may also include: (a) receiving a second protocol message from the network node, wherein the second protocol message indicates that a second user equipment (UE) device is to be paged and includes a second flag; and (b) in response to determining that the second flag is equal to a second state corresponding to non-link-budget-limited status, paging the second UE device without using any of the one or more paging enhancement mechanisms.

In some embodiments, the action of paging the UE device includes periodically transmitting the paging message to the UE device.

In some embodiments, the action of periodically transmitting the paging message includes transmitting the paging message a predetermined number of times, wherein the predetermined number is greater than one.

In some embodiments, the action of periodically transmitting the paging message includes repeatedly transmitting the paging message until a random access procedure initiated by the UE device is completed.

Various Additional Paging Embodiments

In one set of embodiments, a method for operating a base station may be performed as follows, to facilitate paging of user equipment (UE) devices that are link budget limited is disclosed. The method comprises performing, by the base station, a plurality of operations.

The operations may include transmitting a first paging identifier in a control channel of a particular subframe of a particular frame of a downlink data stream, wherein the first paging identifier is dedicated for paging link budget limited UE devices, and is different from a second paging identifier used for paging UE devices that are not link budget limited, wherein the particular frame and the particular subframe are selected for said transmission of the first paging identifier based on a paging frame indicator and a paging occasion indicator associated with one or more link-budget limited UE devices to be paged.

The operations may include transmitting paging payload information for the one or more link-budget limited UE devices in the particular subframe of the particular frame.

The operations may include transmitting the same paging payload information in each of one or more subframes that follow consecutively after the particular subframe.

In some embodiments, a number of the one or more subframes that follow consecutively after the particular subframe is one or two or three or four.

In some embodiments, the operations also include transmitting the number of the one or more subframes that follow consecutively after the particular subframe in the particular frame.

In some embodiments, the paging payload information includes, for each of the one or more link budget limited UEs, a corresponding subscriber identity.

In some embodiments, the paging occasion indicator is a member of the set {0,5}.

In some embodiments, the operations also include: in response to an indication that at least of the one or more link budget limited UE devices has not yet connected to the base station, transmitting the paging payload information in each of two or more subframes of a first additional frame of the downlink data stream, wherein the first additional frame occurs one DRX cycle after the particular frame.

In some embodiments, the operations also include: in response to an indication that at least of the one or more link budget limited UE devices has not yet connected to the base station, performing up to $N_{SC}$-1 transmission iterations, wherein $N_{SC}$ is greater than or equal to two. Each of the transmission iterations may include: (a) transmitting the paging payload information in each of two or more subframes of an additional frame, wherein the additional frame occurs a positive integer multiple of DRX cycles after the particular frame, wherein the paging payload information has been encoded in each of two or more subframes of the additional frame; and (b) in response to a determination that all of the one or more link budget limited UE devices have accessed the base station, not performing any further of the transmission iterations.

In some embodiments, the operations also include: in response to an indication that the one or more link budget limited UE devices have all connected to the base station, initiate a new page transmission to one or more other UE devices.

In one set of embodiments, a method for operating a user equipment (UE) device that is link budget limited may be performed as follows. The method comprises performing, by the UE device, a plurality of operations.

The operations may include computing a paging frame indicator and a paging occasion indicator based on: (a) one or more paging parameters received from a signal transmitted by a base station; and (b) a subscriber identity of the UE device.

The operations may include determining whether a control channel of a particular subframe of a particular frame of said signal includes a first paging identifier, wherein the first paging identifier is dedicated for paging link budget limited UE devices, and is different from a second paging identifier used for paging UE devices that are not link budget limited, wherein the particular frame and the particular subframe are selected from said signal based on the paging frame indicator and the paging occasion indicator.

The operations may include receiving an initial symbol data set from the particular subframe of the particular frame.

The operations may include receiving one or more additional symbol data sets respectively from one or more subframes that follow consecutively after the particular subframe within the particular frame, wherein the same paging payload information has been included in the particular subframe and each of the one or more subframes that follow consecutively after the particular subframe.

The operations may include decoding the paging payload information based on the initial symbol data set and the one or more additional symbol data sets.

In some embodiments, a number of the one or more subframes that follow consecutively after the particular subframe is one or two or three or four.

In some embodiments, a number of the one or more subframes that follow consecutively after the particular subframe is received from said signal.

In some embodiments, the paging occasion indicator is a member of the set {0,5}.

In some embodiments, the operations also include, in response to determining that said decoding has failed to correctly recover the paging payload information: (a) receiving two or more further symbol data sets from a first additional frame, wherein the first additional frame occurs one DRX cycle after the particular frame, wherein the paging payload information has been included in each of two or more subframes of the first additional frame, wherein each of the further symbol data sets corresponds to a respective one of the two or more subframes of the first additional frame; and (b) decoding the paging payload information based on the initial symbol data set, the one or more additional symbol data sets, and the two or more further symbol data sets.

In some embodiments, the operations also include: in response to determining that said decoding has failed to correctly recover the paging payload information, performing up to $N_{SC}$-1 processing iterations, wherein $N_{SC}$ is greater than or equal to two, wherein each of the processing iterations includes: (a) receiving two or more further symbol data sets from an additional frame, wherein the additional frame occurs a positive integer multiple of DRX cycles after the particular frame, wherein the paging payload information has been included in each of two or more subframes of the additional frame, wherein each of the further symbol data sets corresponds to a respective one of the two or more subframes of the additional frame; (b) decoding the paging payload information based on data including the two or more further symbol data sets; (c) accessing the base station and not performing any further of the processing iterations if said decoding successfully recovers the paging payload information.

In some embodiments, information indicating the integer $N_{SC}$ included in a system information broadcast.

In some embodiments, the operations also include, in response to determining that said decoding has correctly recovered the paging payload information, performing a random access procedure to access the base station if the paging payload information indicates the UE device is being paged.

In one set of embodiments, a method for operating a base station may include the following operations.

The method may include transmitting a paging message for a link-budget-limited UE device, wherein the paging message includes paging control information and paging payload information, wherein at least a portion of the paging control information is scrambled with a first P-RNTI (Paging-Radio Network Temporary Identifier), wherein the first P-RNTI is different from a second P-RNTI used by the base station to page non-link-budget-limited UE devices.

In some embodiments, the action of transmitting the paging message includes boosting power of control channel elements containing the paging control information, wherein said boosting of power is relative to a power used to transmit paging control to the non-link-budget-limited UE devices.

In some embodiments, the method also includes transmitting a second paging message for a non-link-budget-limited UE device, wherein the second paging message includes second paging control information and second paging payload information, wherein at least a portion of the second paging control information is scrambled with the second P-RNTI (Paging-Radio Network Temporary Identifier).

In some embodiments, the paging message is transmitted in a particular subframe of a particular frame, wherein a subframe number of the particular subframe and a frame number of the particular subframe are selected for said transmission of the paging message based on: a DRX cycle value; a parameter nB; and a subscriber identity of the UE device.

In one set of embodiments, a base station may include: at least one radio coupled to an antenna subsystem; and a processing agent coupled to the at least one radio. The processing agent is configured to transmit, via the at least one radio, a paging message for a link-budget-limited UE device, wherein the paging message includes paging control information and paging payload information, wherein at least a portion of the paging control information is scrambled with a first P-RNTI (Paging-Radio Network Temporary Identifier), wherein the first P-RNTI is different from a second P-RNTI used by the base station to page non-link-budget-limited UE devices.

In some embodiments, said transmitting the paging message includes boosting power of control channel elements containing the paging control information, wherein said boosting of power is relative to a power used to transmit paging control to the non-link-budget-limited UE devices.

In some embodiments, the processing agent is further configured to transmit, via the at least one radio, a second paging message for a non-link-budget-limited UE device, wherein the second paging message includes second paging control information and second paging payload information, wherein at least a portion of the second paging control information is scrambled with the second P-RNTI (Paging-Radio Network Temporary Identifier).

In some embodiments, the paging message is transmitted in a particular subframe of a particular frame, wherein a subframe number of the particular subframe and a frame number of the particular subframe are selected for said transmission of the paging message based on: a DRX cycle value; a parameter nB; and a subscriber identity of the UE device.

In one set of embodiments, a method for operating a user equipment (UE) device may be performed as follows.

The method may include receiving a downlink signal to obtain a data record including a plurality of samples.

The method may include, in response to a determination that said UE device has been classified as being link budget limited, performing operations including: (a) determining whether a control channel of the data record includes at least a portion that has been scrambled with a first P-RNTI (Paging-Radio Network Temporary Identifier), wherein the first P-RNTI is different from a second P-RNTI used by a base station to page non-link-budget-limited UE devices; and (b) in response to said determination identifying that the control channel includes said at least a portion that has been scrambled with the first P-RNTI, decoding paging control information in the control channel, wherein the paging control information identifies location of resources containing paging payload information for the UE device.

In some embodiments, the base station is configured to transmit the downlink signal, wherein said transmission of the downlink signal includes boosting power of control channel elements containing the paging control information, wherein said boosting of power is relative to a power used to transmit paging control to the non-link-budget-limited UE devices.

In some embodiments, the data record is obtained from a particular subframe of a particular frame of the downlink signal, wherein a subframe number of the particular subframe and a frame number of the particular subframe are determined based on paging configuration information broadcast by the base station and a subscriber identity of the UE device.

In some embodiments, the method may also include: receiving a second downlink signal to obtain a second data record including a plurality of samples; and in response to a determination that said UE device has been classified as not being link budget limited, performing operations including: determining whether a second control channel of the second data record includes at least a portion that has been scrambled with the second P-RNTI; and in response to said determination identifying that the second control channel includes said at least a portion that has been scrambled with the second P-RNTI, decoding second paging control information in the second control channel, wherein the second paging control information identifies location of second resources containing second paging payload information for the UE device.

In one set of embodiments, a method for operating a base station may be performed as follows. The method may include performing K transmissions of a paging message for a link-budget-limited UE device, wherein K is greater than one, wherein, for each k in the set $\{0, 1, 2, \ldots, K-1\}$, a $k^{th}$ transmission of the K transmissions occurs in a respective frame that occurs kN frames after a particular frame, wherein N is an integer greater than or equal to one, wherein each of the K transmissions occurs in a $j^{th}$ subframe of the respective frame, wherein the subframe number j is the same for the K transmissions and is selected from a first set of paging occasions that is disjoint from a second set of paging occasions used to page non-link-budget-limited UE devices.

In some embodiments, the paging message includes paging control information and paging payload information. For each of the K transmissions: the paging control information is included in a control channel of the $j^{th}$ subframe of the respective frame; and the paging payload information is included in a shared channel of the $j^{th}$ subframe of the respective frame.

In some embodiments, the set of resources used to carry the paging payload information in each shared does not change over the K transmissions.

In some embodiments, transmission power of the paging control information is boosted relative to transmission power of paging control transmitted to the non-link-budget-limited UE devices.

In some embodiments, transmission power of the paging payload information is boosted relative to transmission power of paging payload transmitted to the non-link-budget-limited UE devices.

In some embodiments, the paging message includes paging control information and paging payload information, wherein, for each of the K transmissions, the paging payload information is transmitted using the same modulation-and-coding scheme (MCS).

In one set of embodiments, a method for operating a user equipment (UE) device that is link-budget-limited may be performed as follows.

The method may include receiving a downlink signal from a base station, wherein the downlink signal includes K respective copies of a paging message, wherein K is greater than one, wherein, for each k in the set $\{0, 1, 2, \ldots, K-1\}$, a $k^{th}$ copy of the K copies occurs in a respective frame that occurs kN frames after a particular frame of the downlink signal, wherein N is an integer greater than or equal to one, wherein each of the K copies occurs in a $j^{th}$ subframe of the respective frame, wherein the subframe number j is the same for the K copies and is selected from a first set of paging occasions that is disjoint from a second set of paging occasions configured by the base station for paging non-link-budget-limited UE devices.

The method may also include attempting to decode the paging message from the K copies of the paging message.

The method may also include, in response to determining that said attempt to decode the paging message is successful, initiating a random access procedure if the paging message includes information identifying the UE device as a target of the paging message.

In some embodiments, the action of attempting to decode the paging message includes: attempting to decode paging control information of the paging message based on PDCCH portions of the K respective copies of the paging message; and in response to determining that the paging control information is successfully decoded, attempting to decode paging payload information of the paging message based on PDSCH portions of the K respective copies of the paging message.

In some embodiments, the paging message includes paging control information and paging payload information, wherein, for each of the K respective copies of the paging message, a set of resources used to carry the paging payload information in the $j^{th}$ subframe of the respective frame does not change over the K respective copies.

In one set of embodiments, a method for operating a base station may be performed as follows.

The method may include receiving protocol messages from a network entity, wherein the protocol messages indicate respective requests to page a user equipment (UE) device.

The method may also include transmitting paging messages to the UE device, wherein each of the paging messages is transmitted in response to receiving a corresponding one of the protocol messages, wherein power of transmission for each of the paging messages after an $N^{th}$ of the paging messages is larger than power of transmission for a first N of the paging messages, wherein N is a positive integer.

In some embodiments, N is greater than one.

In some embodiments, the network entity is a Mobility Management Entity (MME) of an LTE network, wherein the protocol message is an S1 AP message.

In some embodiments, power of transmission increases for each successive paging message after the $N^{th}$ of the paging messages.

In some embodiments, the method also includes: maintaining a count of the paging messages that have been previously transmitted to the UE device; and comparing the count to the positive integer N in order to determine the power of transmission of a current one of the paging messages.

In some embodiments, the method also includes: maintaining a count of the number of said protocol messages that have been received; and comparing the count to a threshold that depends on the positive integer N in order to determine the power of transmission of a current one of the paging messages.

In one set of embodiments, a method for operating a base station may be performed as follows.

The method may include receiving protocol messages from a network entity, wherein the protocol messages indicate respective requests to page a user equipment (UE) device.

The method may also include directing a transmitter of the base station to transmit paging messages to the UE device with respective power levels, wherein, for each of the paging messages, said directing the transmitter to transmit the paging message is performed in response to receiving a corresponding one of the protocol messages, wherein the power level for each of the paging messages after an $N^{th}$ of the paging messages is larger than the N power levels for a first N of the paging messages, wherein N is a positive integer.

In some embodiments, the method may also include determining that the protocol messages occur within a temporal window starting at an arrival time of a first of the protocol messages, wherein the temporal window has a predetermined temporal width.

In some embodiments, N is greater than one.

In some embodiments, the network entity is a Mobility Management Entity (MME) of an LTE network, wherein the protocol message is an S1 AP message.

In some embodiments, the power level increases for each successive paging message after the $N^{th}$ of the paging messages.

In some embodiments, the method may also include: (a) maintaining a count of the paging messages that have been previously transmitted to the UE device; and (b) comparing the count to the positive integer N in order to determine the power level for a current one of the paging messages.

In some embodiments, the method may also include (a) maintaining a count of the number of said protocol messages that have been received; and (b) comparing the count to a threshold that depends on the positive integer N in order to determine the power level for a current one of the paging messages.

In one set of embodiments, a base station comprises at least one radio coupled to an antenna subsystem; and a processing element coupled to the at least one radio. The processing element may be configured to: transmit, via the at least one radio, one or more first paging messages to a first user equipment (UE) device, wherein the one or more first paging messages are transmitted with a first transmit power; and transmit, via the at least one radio, one or more additional paging messages, wherein the one or more additional paging messages are transmitted with a higher transmit power than the first transmit power, wherein transmission of the one or more paging messages to the first UE device occurs with the higher transmit power in response to failure of the first UE device to respond to the one or more first paging messages.

In some embodiments, the base station is configured to transmit a plurality of the additional paging messages to the first UE device up until a threshold number of paging messages.

In some embodiments, the base station is configured to boost a transmit power for each successive one of the plurality of additional paging messages to the first UE device.

In one set of embodiments, a method for operating a user equipment (UE) device that is link budget limited may be performed as follows.

The method may include transmitting a request to a node in a network, wherein the request includes a DRX cycle index, wherein the DRX cycle index is set to a first state that is used to indicate that the UE device is link budget limited (LBL).

The method may also include receiving a paging message from a base station of the network, wherein the base station is configured to transmit the paging message using one or more paging enhancement mechanisms reserved for use with UE devices that are identified as being link budget limited.

In some embodiments, the base station is configured to: receive a protocol message from the network node, wherein the protocol message indicates that the UE device is to be paged and includes the DRX cycle index; and in response to determining that the DRX cycle index in the protocol message equals the first state, transmit the paging message using the one or more paging enhancement mechanisms.

In some embodiments, four or more possible states of the DRX cycle index correspond respectively to four or more values of DRX cycle, wherein the first state of the DRX cycle index is equal to one of the four or more states.

In some embodiments, the first state corresponds to a maximal one of the four or more DRX cycle values.

In some embodiments, the first state corresponds to a minimal one of the four or more DRX cycle values.

In some embodiments, a format of the DRX cycle index conforms to the LTE standard (e.g., 3GPP TS 24.008).

In some embodiments, the first state corresponds to one of the four or more DRX cycle values that is not commonly used by conventional user equipment devices conforming to the LTE standard.

In some embodiments, in at least one mode of operation of the UE device, the four or more values of DRX cycle include the values 32, 64, 128 and 256.

In some embodiments, a second UE device that is link budget limited is configured to use the first state of the DRX cycle index as a signal of its status as a link-budget-limited device when transmitting tracking area updates and/or attach requests to the network.

In some embodiments, a second UE device that is not link budget limited is configured so that it never uses the first state of the DRX cycle index when transmitting tracking area updates and/or attach requests to the network.

In some embodiments, the request is a request for attachment to the network and/or a request for tracking area update.

In some embodiments, the network node is a Mobility Management Entity (MME).

In some embodiments, the MME conforms to the LTE standard.

In some embodiments, a first of the one or more paging enhancement mechanisms includes the base station performing a plurality of transmissions of the paging message, wherein said receiving the paging message from the base station includes: receiving data records corresponding respectively to the plurality of transmissions of the paging message; and decoding the paging message based on a combination of the data records.

In some embodiments, the plurality of transmissions of the paging message occur within a paging cycle.

In some embodiments, a first of the transmissions of the paging message occurs in a paging frame, wherein successive ones of the transmissions are spaced a fixed number of frames apart.

In one set of embodiments, a method for operating a base station may be performed as follows.

The method may include receiving a protocol message from a node in a network, wherein the protocol message indicates that a user equipment (UE) device is to be paged and includes a DRX cycle index.

The method may also include, in response to determining that the DRX cycle index in the protocol message is set to a first state, paging the UE device using one or more paging enhancement mechanisms.

In some embodiments, the node is a Mobility Management Entity (MME), wherein the protocol message is an S1AP message.

In some embodiments, a first of the one or more paging enhancement mechanisms includes repeatedly transmitting a paging message to the UE device until the UE device completes a random access procedure.

In some embodiments, a first of the one or more paging enhancement mechanisms includes transmitting a paging message to the UE device a plurality of times.

In some embodiments, a first of the one or more paging enhancement mechanisms includes transmitting a paging message to the UE device with increased power relative to power used to transmit paging messages to non-LBL devices.

In some embodiments, four or more possible states of the DRX cycle index correspond respectively to four or more values of DRX cycle, wherein the first state of the DRX cycle index is equal to one of the four or more states.

In some embodiments, the first state corresponds to a maximal one of the four or more DRX cycle values.

In some embodiments, the first state corresponds to a minimal one of the four or more DRX cycle values.

In some embodiments, the DRX cycle index conforms to the LTE standard.

In some embodiments, the first state corresponds to one of the four or more DRX cycle values that is not commonly used by conventional LTE-conforming user equipment devices when performing tracking area updates and attach requests.

In some embodiments, the method also includes: receiving a second protocol message from the network node, wherein the second protocol message indicates that a second user equipment (UE) device is to be paged and includes a second DRX cycle index; and in response to determining that the second DRX cycle index in the second protocol message is set to a value different from the first state, paging the second UE device without using any of the one or more paging enhancement mechanisms.

In some embodiments, the action of paging the UE device includes periodically transmitting the paging message to the UE device.

In some embodiments, a period of said periodically transmitting is equal to a minimum of: a DRX cycle value corresponding to the first state of the DRX cycle index; and a default DRX cycle value of a cell corresponding to the base station.

In some embodiments, a period of said periodically transmitting is equal to a default DRX cycle value of a cell corresponding to the base station regardless of the state of the DRX cycle index in the protocol message.

In some embodiments, the action of said periodically transmitting the paging message includes transmitting the paging message a predetermined number of times, wherein the predetermined number is greater than one.

In some embodiments, the action of periodically transmitting the paging message includes repeatedly transmitting the paging message until a random access procedure initiated by the UE device is completed.

In one set of embodiments, a method for operating a user equipment (UE) device may be performed as follows.

The method may include transmitting a request to a node in a network, wherein the request includes a flag that indicates whether or not the UE device is link budget limited.

The method may also include receiving a paging message from a base station of the network, wherein the base station is configured to transmit the paging message using one or more paging enhancement mechanisms reserved for use with UE devices that are identified as being link budget limited.

In some embodiments, the base station is configured to: receive a protocol message from the network node, wherein the protocol message indicates that the UE device is to be paged and includes the flag indicating whether or not the UE device is link budget limited; and in response to determining that the flag is equal to a first state corresponding to link budget limited status, page the UE device using the one or more paging enhancement mechanisms.

In some embodiments, the UE device is link budget limited, wherein the flag is set to a first state that indicates that the UE device is link budget limited.

In some embodiments, the request is a request for attachment to the network and/or a request for tracking area update.

In some embodiments, a first of the one or more paging enhancement mechanisms includes the base station performing a plurality of transmissions of the paging message, wherein said receiving the paging message from the base station includes: receiving data records corresponding respectively to the plurality of transmissions of the paging message; and decoding the paging message based on a combination of the data records.

In some embodiments, the plurality of transmissions of the paging message occur within a paging cycle.

In some embodiments, a first of the transmissions of the paging message occurs in a paging frame, wherein successive ones of the transmissions are spaced a fixed number of frames apart.

In one set of embodiments, a method for operating a base station may be performed as follows.

The method may include receiving a protocol message from a node in a network, wherein the protocol message indicates that a user equipment (UE) device is to be paged and includes a flag indicating whether or not the UE device is link budget limited.

The method may also include, in response to determining that the flag is equal to a first state corresponding to link budget limited status, paging the UE device using one or more paging enhancement mechanisms.

In some embodiments, the node is a Mobility Management Entity (MME), wherein the protocol message is an S1AP message.

In some embodiments, a first of the one or more paging enhancement mechanisms includes repeatedly transmitting a paging message to the UE device until the UE device completes a random access procedure.

In some embodiments, a first of the one or more paging enhancement mechanisms includes transmitting a paging message to the UE device a plurality of times.

In some embodiments, a first of the one or more paging enhancement mechanisms includes transmitting a paging message to the UE device with increased power relative to power used to transmit paging messages to non-LBL devices.

In some embodiments, the method also includes: receiving a second protocol message from the network node, wherein the second protocol message indicates that a second user equipment (UE) device is to be paged and includes a second flag; and in response to determining that the second flag is equal to a second state corresponding to non-link-budget-limited status, paging the second UE device without using any of the one or more paging enhancement mechanisms.

In some embodiments, the action of paging the UE device includes periodically transmitting the paging message to the UE device.

In some embodiments, the action of periodically transmitting the paging message includes transmitting the paging message a predetermined number of times, wherein the predetermined number is greater than one.

In some embodiments, the action of periodically transmitting the paging message includes repeatedly transmitting the paging message until a random access procedure initiated by the UE device is completed.

In one set of embodiments, a method for operating a node in a communication network may be performed as follows.

The method may include receiving a request from a UE device.

The method may also include, in response to determining that the request includes an indication that the second UE device is link budget limited, assigning an S-TMSI value to the UE device, wherein the S-TMSI value is selected from a reserved subset of a space of possible S-TMSI values, wherein the reserved subset is reserved for link-budget-limited UE devices.

The method may also include transmitting a protocol message to a base station, wherein the protocol message indicates that the UE device is to be paged and includes the assigned S-TMSI value.

In some embodiments, the method may also include: (a) receiving a second request from a second UE device; (b) in response to determining that the second request does not include the indication that the UE device is link budget limited, assigning a second S-TMSI value to the UE device, wherein the second S-TMSI value is selected from a set complement of the reserved subset; and (c) transmitting a second protocol message to the base station, wherein the second protocol message indicates that the second UE device is to be paged and includes the second S-TMSI value.

In some embodiments, the request is a request for attachment to the network.

In some embodiments, the request is a request for a tracking area update.

In some embodiments, the protocol message is transmitted to a plurality of base stations in a tracking area.

In one set of embodiments, a method for operating a base station in a communication network may be performed as follows.

The method may include receiving a protocol message from a node of the communication network, wherein the protocol message indicates that a UE device is to be paged and includes an S-TMSI value assigned to the UE device.

The method may also include, in response to determining that the S-TMSI value belongs to a reserved subset of a space of possible S-TMSI values, paging the UE device using one or more paging enhancement mechanisms, wherein the reserved subset is reserved for link-budget-limited UE devices.

In some embodiments, a first of the one or more paging enhancement mechanisms includes repeatedly transmitting a paging message to the UE device until the UE device completes a random access procedure.

In some embodiments, a first of the one or more paging enhancement mechanisms includes transmitting a paging message to the UE device a plurality of times.

In some embodiments, a first of the one or more paging enhancement mechanisms includes transmitting a paging message to the UE device with increased power relative to power used to transmit paging messages to non-link-budget-limited UE devices.

In one set of embodiments, a base station for operating in a communication network may include: at least one radio coupled to an antenna subsystem; and a processing agent coupled to the at least one radio. The processing agent is configured to implement: (a) receiving, via the at least one radio, a protocol message from a node of the communication network, wherein the protocol message indicates that a UE device is to be paged and includes an S-TMSI value assigned to the UE device; and (b) in response to determining that the S-TMSI value belongs to a reserved subset of a space of possible S-TMSI values, paging, via the at least one radio, the UE device using one or more paging enhancement mechanisms, wherein the reserved subset is reserved for link-budget-limited UE devices.

In some embodiments, a first of the one or more paging enhancement mechanisms includes repeatedly transmitting a paging message to the UE device until the UE device completes a random access procedure.

In some embodiments, a first of the one or more paging enhancement mechanisms includes transmitting a paging message to the UE device a plurality of times.

In some embodiments, a first of the one or more paging enhancement mechanisms includes transmitting a paging message to the UE device with increased power relative to power used to transmit paging messages to non-link-budget-limited UE devices.

In some embodiments, the processing agent is further configured to implement: receiving, via the at least one radio, a second protocol message from the node of the communication network, wherein the second protocol message indicates that a second UE device is to be paged and includes a second S-TMSI value assigned to the second UE device; and in response to determining that the second S-TMSI value belongs to a set complement of the reserved subset, paging, via the at least one radio, the second UE device without using any of the one or more paging enhancement mechanisms.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

In some embodiments, an integrated circuit may be configured to include digital and/or analog circuitry, where the circuitry is configured to implement a method, e.g., any of the various method embodiments described herein (or, any combination of the method embodiments described herein, or, any subset of any of the method embodiments described herein, or, any combination of such subsets). The integrated circuit may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A base station comprising:
   at least one radio coupled to an antenna subsystem; and
   a processing agent coupled to the at least one radio, where the processing agent is configured to:
      receive status information indicating that a first user equipment (UE) device is link-budget-limited;
      in response to receiving the status information, transmit, via the at least one radio, a paging message for the first UE device, wherein the paging message includes paging control information and paging payload information, wherein at least a portion of the paging control information is scrambled with a first P-RNTI (Paging-Radio Network Temporary Identifier), wherein the first P-RNTI is different from a second P-RNTI used by the base station to page non-link-budget-limited UE devices, wherein the paging message is transmitted in a particular subframe of a particular frame,
   wherein a subframe number of the particular subframe and a frame number of the particular frame are selected for said transmission of the paging message based on: a DRX cycle value; a parameter nB; and a subscriber identity of the first UE device.

2. The base station of claim 1, wherein said transmitting the paging message includes boosting power of control channel elements containing the paging control information, wherein said boosting of power is relative to a power used to transmit paging control to the non-link-budget-limited UE devices.

3. The base station of claim 1, wherein the processing agent is further configured to transmit, via the at least one radio, a second paging message for a non-link-budget-limited UE device, wherein the second paging message includes second paging control information and second paging payload information, wherein at least a portion of the second paging control information is scrambled with the second P-RNTI (Paging-Radio Network Temporary Identifier).

4. The base station of claim 1, wherein the processing agent is further configured to:
   re-transmit the paging payload information in each of two or more subframes of a frame that occurs one or more DRX cycles after the particular frame.

5. The base station of claim 1, wherein an indication of the number of the one or more subframes is received as part of system information that is broadcasted by the base station.

6. The base station of claim 1, wherein the processing agent is further configured to:
   re-transmit the paging payload information in each of one or more subframes that follow consecutively after the particular subframe and that are within the particular frame.

7. A method for operating a base station, the method comprising:
   receiving status information indicating that a first user equipment (UE) device is link-budget-limited;
   in response to receiving the status information, transmitting, via at least one radio, a paging message for the first UE device, wherein the paging message includes paging control information and paging payload information, wherein at least a portion of the paging control information is scrambled with a first P-RNTI (Paging-Radio Network Temporary Identifier), wherein the first P-RNTI is different from a second P-RNTI used by the base station to page non-link-budget-limited UE devices, wherein the paging message is transmitted in a particular subframe of a particular frame,
   wherein a subframe number of the particular subframe and a frame number of the particular frame are selected for said transmission of the paging message based on: a DRX cycle value; a parameter nB; and a subscriber identity of the first UE device.

8. The method of claim 7, wherein said transmitting the paging message includes boosting power of control channel elements containing the paging control information, wherein said boosting of power is relative to a power used to transmit paging control to the non-link-budget-limited UE devices.

9. The method of claim 7, further comprising:
   transmitting, via the at least one radio, a second paging message for a non-link-budget-limited UE device, wherein the second paging message includes second paging control information and second paging payload information, wherein at least a portion of the second paging control information is scrambled with the second P-RNTI (Paging-Radio Network Temporary Identifier).

10. The method of claim 7, wherein the method further comprises:

re-transmitting the paging payload information in each of two or more subframes of a frame that occurs one or more DRX cycles after the particular frame.

11. The method of claim 7, wherein an indication of the number of the one or more subframes is received as part of system information that is broadcasted by the base station.

12. The method of claim 7, further comprising:
re-transmitting the paging payload information in each of one or more subframes that follow consecutively after the particular subframe and that are within the particular frame.

13. A non-transitory memory medium for operating a base station, wherein the memory medium stores program instruction, wherein the program instructions, when executed by a processor, cause the base station to implement:
receiving status information indicating that a first user equipment (UE) device is link-budget-limited;
in response to receiving the status information, transmitting, via at least one radio, a paging message for the first UE device, wherein the paging message includes paging control information and paging payload information, wherein at least a portion of the paging control information is scrambled with a first P-RNTI (Paging-Radio Network Temporary Identifier), wherein the first P-RNTI is different from a second P-RNTI used by the base station to page non-link-budget-limited UE devices, wherein the paging message is transmitted in a particular subframe of a particular frame,
wherein a subframe number of the particular subframe and a frame number of the particular frame are selected for said transmission of the paging message based on: a DRX cycle value; a parameter nB; and a subscriber identity of the first UE device.

14. The non-transitory memory medium of claim 13, wherein said transmitting the paging message includes boosting power of control channel elements containing the paging control information, wherein said boosting of power is relative to a power used to transmit paging control to the non-link-budget-limited UE devices.

15. The non-transitory memory medium of claim 13, wherein the program instructions, when executed by the processor, further cause the base station to implement:
transmitting, via the at least one radio, a second paging message for a non-link-budget-limited UE device, wherein the second paging message includes second paging control information and second paging payload information, wherein at least a portion of the second paging control information is scrambled with the second P-RNTI (Paging-Radio Network Temporary Identifier).

16. The non-transitory memory medium of claim 13, wherein the program instructions, when executed by the processor, further cause the base station to implement:
re-transmitting the paging payload information in each of two or more subframes of a frame that occurs one or more DRX cycles after the particular frame.

17. The non-transitory memory medium of claim 13, wherein the program instructions, when executed by the processor, further cause the base station to implement:
re-transmitting the paging payload information in each of one or more subframes that follow consecutively after the particular subframe and that are within the particular frame.

* * * * *